(12) United States Patent
Watanabe et al.

(10) Patent No.: US 6,282,911 B1
(45) Date of Patent: Sep. 4, 2001

(54) AIR CONDITIONING SYSTEM FOR AUTOMOTIVE VEHICLE

(75) Inventors: Masaya Watanabe; Takako Ikegami, both of Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/482,894

(22) Filed: Jan. 14, 2000

(30) Foreign Application Priority Data

Jan. 18, 1999 (JP) .................................................. 11-009519

(51) Int. Cl.$^7$ ...................................................... B60H 1/32
(52) U.S. Cl. ............................. 62/244; 454/129; 454/143
(58) Field of Search ............................. 62/244; 454/129, 454/136, 137, 75, 143

(56) References Cited

U.S. PATENT DOCUMENTS

| | | | |
|---|---|---|---|
| 3,555,846 | * | 1/1971 | Harbeck et al. .......................... 62/244 |
| 4,763,564 | * | 8/1988 | Czarnecki et al. ....................... 62/244 |
| 5,222,661 | | 6/1993 | Wenhart ................................. 236/49.3 |
| 5,248,278 | * | 9/1993 | Fuerst et al. ........................... 454/137 |
| 5,531,641 | * | 7/1996 | Aldrich ................................. 454/137 |
| 5,971,844 | * | 10/1999 | Samukawa et al. ....................... 454/75 |

FOREIGN PATENT DOCUMENTS

| | | |
|---|---|---|
| 0 503 987 A1 | 9/1992 | (EP) . |
| 4-306120 | 10/1992 | (JP) . |
| 9-220922 | 8/1997 | (JP) . |
| WO 95/17314 | 6/1995 | (WO) . |

* cited by examiner

Primary Examiner—William E. Tapolcai
(74) Attorney, Agent, or Firm—Nixon Peabody LLP; Donald R. Studebaker

(57) ABSTRACT

An air conditioning system for an automotive vehicle having a sunroof, a sunshade comprising a number of louvers and installed in a ceiling opening located below the sunroof, and a roof air path formed between the sunroof and sunshade so as to be in communication with an air path of the air conditioning system blows cold air into a passenger compartment through the sunshade via the roof air path during cooling operation controlling angles of the louvers of the sunshade, and draws recirculated air from an upper part of the passenger compartment by a sub-blower and direct the recirculated air to a main blower during heating operation.

13 Claims, 12 Drawing Sheets

FIG. 6

OPERATION MODE MAP

|  | SMALL ← ROOM TEMPERATURE DIFFERENCE → LARGE |  |  |
|---|---|---|---|
| HIGH | M1/2 | C4 | C1 |
| SOLAR RADIATION INTENSITY |  | C5 | C2 |
| LOW | M3 | C6 | C3 |

FIG. 7

OPERATION PATTERN

|  | C1 | C2 | C3 | C4 | C5 | C6 | M1/2 | M3 |
|---|---|---|---|---|---|---|---|---|
| SIDE REGISTER | OPEN | ← | ← | ← | ← | ← | CLOSE | ← |
| MODE DOOR C | OPEN | ← | CLOSE | OPEN | CLOSE | ← | ← | ← |
| OUTSIDE/INSIDE AIR INLET DOOR | INSIDE | ← | ← | OUTSIDE | ← | ← | ← | ← |
| MODE DOOR A | CLOSE | ← | OPEN | CLOSE | OPEN | ← | ← | ← |
| MODE DOOR B | CLOSE | ← | ← | ← | ← | ← | ← | ← |
| INSIDE AIR INLET DOOR | OPEN | ← | ← | ← | ← | ← | ← | ← |
| RECIRCULATION DOOR | OPEN | CLOSE | ← | ← | ← | ← | ← | ← |
| SUNSHADE | OPEN | ← | TURN | CLOSE | TURN | OPEN | TURN | OPEN |
| SUNROOF | TILT-UP | CLOSE | ← | ← | ← | ← | ← | ← |

OPERATION MODE MAP

OPERATION PATTERN

|  | H6 | H5 | H4 | H2/3 | H1 |
|---|---|---|---|---|---|
| SIDE REGISTER | CLOSE | OPEN | ← | ← | ← |
| MODE DOOR C | OPEN | ← | CLOSE | ← | ← |
| OUTSIDE/INSIDE AIR INLET DOOR | INSIDE | INSIDE OUTSIDE | ← | OUTSIDE | ← |
| MODE DOOR A | OPEN | ← | ← | ← | ← |
| MODE DOOR B | CLOSE | OPEN | ← | ← | ← |
| INSIDE AIR INLET DOOR | OPEN | ← | CLOSE | ← | ← |
| RECIRCULATION DOOR | CLOSE | ← | ← | ← | ← |
| SUNSHADE | CLOSE | ← | OPEN | ← | TURN |
| SUNROOF | CLOSE | ← | ← | ← | ← |

AIR CONDITIONING SYSTEM FOR AUTOMOTIVE VEHICLE

BACKGROUND OF THE INVENTION

1. Field of the Invention

The present invention relates to an air conditioning system for a motor car.

2. Description of Related Art

Typically, automobiles are equipped with air conditioning systems for making drivers far more comfortable in hot or cold. Such an air conditioning system has air outlets disposed at a plurality of locations in the passenger compartment through which heated or cooled conditioning air blows into the passenger compartment. These air outlets, which are typically formed in the instrument panel located in front of the driver, include defroster air outlets through which conditioning air blows towards the front wind shield, side air outlets opening at opposite sides of the front of the instrument panel, a center air outlet opening at the center of the instrument panel and foot air outlet through which conditioning air blows towards feet of the driver. An air conditioning systems of this type such as described in, for example, Japanese Utility Patent Publication No. 5-408 has an air outlet opening in the ceiling of the passenger compartment. In this air conditioning system, conditioning air is introduced into a space between a sunroof and a sunshade which is formed with a plurality of openings as sunshade air outlets so that the conditioning air blows into the passenger compartment through the sunshade air outlets. This type of air conditioning system is enabled to blow conditioning air into the passenger compartment through a number of air outlets without complicating duct arrangement. There have been also proposed an air conditioning system which can discharge hot air out of the passenger compartment through a sunroof while the interior of the room temperature of the passenger compartment is high system as described in, for example, Japanese Unexamined Patent Publication No. 4-306120 and an air conditioning system which can blow conditioning air through air outlets in the instrument panel and a ceiling air outlet so as to eliminate a temperature difference of the room temperature from a selected temperature while the solar radiation intensity is high as described in, for example, Japanese Unexamined Patent Publication No. 9-220922.

In the prior art air conditioning system which controls air blow into the passenger compartment only through air outlets formed in the instrument panel and the ceiling of the compartment, there is such a fear that the passenger compartment is difficult to be kept far more comfortable. For example, although the passenger compartment is evenly cooled by causing conditioning air to blow from the ceiling of the passenger compartment with an effect of making the passengers comfortable while it is at a desired temperature setting, air conditioning rather gives uncomfortable feelings if conditioning air blows too much from the ceiling of the passenger compartment in the case where the passenger compartment is at a high temperature and is necessary to be rapidly cooled, in other words, where the outlet air temperature is controlled to be considerably lower than the room temperature. In such case, cold wind blows against the neck of the passenger according to wind directions, which gives the passenger an uncomfortable feeling more strongly than a feeling of cool.

SUMMARY OF THE INVENTION

It is therefore an object of the present invention to provide an automobile air conditioning system which can supply conditioning air from a ceiling of a passenger compartment of an automobile without giving the passenger uncomfortable feelings so as thereby to provide improved comfort of the passenger compartment.

According to a concept of the present invention, the air conditioning system for an automotive vehicle equipped with a sunroof which is automatically tilted up and down and a ceiling of a passenger compartment which has a ceiling opening located below the sunroof and automatically opened and closed, the air conditioning system which comprises a conditioning air path in which conditioning air flows, blower means for drawing in at least recirculated air recirculating inside the passenger compartment and discharging the recirculated air as conditioning air into the conditioning air path, air temperature controlling means for controlling a temperature of the conditioning air flowing in the conditioning air path, front air outlets to which the conditioning air path leads and through which the conditioning air blows toward passengers in the passenger compartment from the front of the passenger compartment, a roof air path formed between the sunroof and the ceiling opening so as to lead to the ceiling opening from the conditioning air path, a room temperature sensor for monitoring a room temperature in the passenger compartment of the vehicle, room temperature setting means for setting a desired room temperature, and control means for switching the air conditioning system in operation from a first operation mode wherein the air conditioning system opens the sunroof and closes the ceiling opening according to differences of the room temperature from the desired room temperature so that the conditioning air flowing in the conditioning air path is partly introduced into the roof air path and then forced out of the vehicle through the sunroof and partly cooled by the air temperature controlling means and forced to blow into the passenger compartment through the front air outlets to a second operation mode wherein, subsequently to operation in the first operation mode, the conditioning air is forced to blow into the passenger compartment through the front air outlets only when the difference of the room temperature from the desired room temperature is larger than a specified value and an amount of the conditioning air blowing into the passenger compartment through the front air outlets is reduced and an amount of the conditioning air introduced into the roof air path and then forced out of the vehicle through the sunroof is increased when the difference of the room temperature from the desired room temperature is smaller than the specified value.

In the air conditioning system, incoming air, recirculated or outside, that is passed through the conditioning air path by the blower means, blows into the passenger compartment after controlled, i.e. heated or cooled, to a desired outlet air temperature. The conditioning air path is provided with the front air outlets and the ceiling opening as a ceiling air inlet/outlet through which conditioning air blows into the passenger compartment. In this operation mode, while the recirculated air is discharged through the sunroof, the conditioning air at a low temperature blows into the passenger compartment. For example, when starting air conditioning a passenger compartment at a high room temperature while the vehicle stands in very hot whether, the air conditioning system operates in that operation mode, so as to forces out hot air out of the passenger compartment. Thereafter, proportions of amounts of conditioning air blowing into the passenger compartment through the front air outlets and the ceiling opening are regulated according to temperatures of the passenger compartment.

According to another concept of the present invention, the air conditioning system for an automotive vehicle comprises a conditioning air path through which at least one of recirculated air recirculating inside a passenger compartment of the vehicle and outside air introduced from the outside of the vehicle is introduced and flows, blower means for drawing in air through the conditioning air path and discharging the air as conditioning air into the conditioning air path, air temperature controlling means for controlling a temperature of the conditioning air flowing in the conditioning air path, a ceiling opening formed in a ceiling of the passenger compartment and in communication with the conditioning air path, front air outlets to which the conditioning air path leads and through which the conditioning air blows toward passengers in the passenger compartment from the front of the passenger compartment, and control means for controlling proportions between amounts of the conditioning air that blows into the passenger compartment through the front air outlets and the ceiling opening according to room conditions in the passenger compartment.

The air conditioning system may further comprises a room temperature sensor for monitoring a room temperature in the passenger compartment and room temperature setting means for setting a desired room temperature. In this embodiment, the control means controls the proportions between amounts of the conditioning air that blows into the passenger compartment through the front air outlets and through the ceiling opening according to differences of the room temperature from the desired room temperature. The control means may force the conditioning air to blow into the passenger compartment through the front air outlets only when the difference of the room temperature from the desired room temperature is larger than a specified value and reduces an amount of the conditioning air blowing into the passenger compartment through the front air outlets and increases an amount of the conditioning air blowing into the passenger compartment through the ceiling opening when the difference of the room temperature from the desired room temperature is smaller than the specified value.

The air conditioning system may further comprises a solar radiation intensity sensor for monitoring an intensity of solar radiation that comes into the passenger compartment. In this embodiment, the control means controls the proportions between amounts of the conditioning air that blows into the passenger compartment through the front air outlets and through the ceiling opening according to the solar radiation intensities. The control means reduces the amount of the conditioning air blowing into the passenger compartment through the front air outlets and increases the amount of the conditioning air blowing into the passenger compartment through the ceiling opening when the solar radiation intensity is lower than a specified value.

In the air conditioning system, the blower means may comprise a main blower which draws in the recirculated air and the outside air and a sub-blower which draws in the recirculated air, and the conditioning air path is provided with a sub-air inlet which opens into the passenger compartment at a center of a floor of the passenger compartment and through which the sub-blower draws recirculated air and switching means for switching drawing of recirculated air from a state wherein the recieculated air is drawn by the sub-blower through the sub-air inlet to a state where the recieculated air is drawn by the sub-blower through the ceiling opening and vice versa and introduces the recirculated air drawn by the sub-blower to the main blower. Further, the blower means may comprise a main blower which draws in the recirculated air and the outside air and a sub-blower which draws in the recirculated air, and the conditioning air path is provided with a sub-air inlet which opens into the passenger compartment at a center of a floor of the passenger compartment and through which the sub-blower draws recirculated air and switching means for switching drawing of recirculated air from a state wherein the reciecculated air is drawn by the sub-blower through the sub-air inlet to a state where the recieculated air is drawn by the sub-blower through the ceiling opening and vice versa and switching direction of the recirculated air from a state wherein the recieculated air drawn by the sub-blower is directed toward the main blower to a state wherein the recieculated air is directed toward the ceiling opening and vice versa.

The conditioning air path may comprise a pillar duct section which extends upward along a center pillar of the vehicle and is in communication with the ceiling opening at one of opposite ends of the pillar duct section, a main duct section which is connected at one of opposite ends to the main blower at an outlet side of the main blower and at another of the opposite ends to another end of the pillar duct section, a sub-inlet duct section which is connected at one end to the sub-blower and at another end to the main duct section so as to be able to switch between a state wherein the sub-inlet duct section is in communication with the pillar duct section and a state wherein the sub-inlet duct section is isolated from the pillar duct section and is provided with the sub-air inlet adapted to be opened and closed, a sub-discharge duct section which is connected at one end to the sub-blower and at another end to the main blower, a recirculation duct section which extends between the main duct section and the sub-discharge duct section, and a damper mechanism operative to switch communication of the sub-discharge duct section and the recirculation duct section between a state wherein the sub-discharge duct section is opened and the sub-discharge duct section is shut off and a state wherein the sub-discharge duct section is shut off and the sub-discharge duct section is opened. The pillar duct section is provided for each of opposite center pillars of the vehicle and the sub-blower is disposed one at a center of a floor of the passenger compartment. Further, the pillar duct section may be provided for each of opposite center pillars of the vehicle and the sub-blower is disposed one at each side of a floor of the passenger compartment in connection with each the pillar duct section.

The air conditioning system may be operative in an operation mode wherein the blower means draws recirculated air into the conditioning air path through at least the ceiling opening and blows the recirculated air into the passenger compartment after increasing a temperature of the recirculated air by the air temperature controlling means or in an operation mode wherein the blower means draws the recieculated air through at least the sub-air inlet and blows the recirculated air into the passenger compartment from the front of the passenger compartment toward passengers in the passenger compartment after increasing or decreasing a temperature of the recirculated air by the air temperature controlling means.

The air conditioning system may further comprise defroster air outlets and be operative in an operation mode wherein the blower means draws the recieculated air through the sub-air inlet and blows the recirculated air through the defroster air outlets after increasing a temperature of the recirculated air by the air temperature controlling means.

In the air conditioning system, incoming air, recirculated or outside, that is passed through the conditioning air path by the blower means, blows into the passenger compartment after controlled, i.e. heated or cooled, to a desired outlet air temperature. The conditioning air path is provided with the front air outlets and the ceiling opening as a ceiling opening through which conditioning air blows into the passenger compartment. In this instance, the air conditioning system controls proportions of amounts of conditioning air that blow into the passenger compartment through the front air outlets and the ceiling opening according to room conditions of the passenger compartment. That is, the air conditioning system decreases the amount of conditioning air blowing through the ceiling opening and increasing the amount of conditioning air blowing through the front air outlets and vice versa. Other wise, the air conditioning system forces conditioning air to blow through either the front air outlets or the ceiling opening only.

According to an embodiment, controlling the proportions of amounts of conditioning air that blow into the passenger compartment through the front air outlets and the ceiling opening is performed according to differences of the room temperature from the desired room temperature setting. For example, during cooling operation, the air conditioning system forces conditioning air to blow against the passengers in the passenger compartment through the front air outlets only when the room temperature difference is larger than a specified value so as to give the passengers feelings of cool and reduces the amount of conditioning air blowing through the front air outlets and increases the amount of conditioning air blowing through the ceiling opening when the room temperature difference is smaller than the specified value as the passenger compartment is conditioned comfortable following a gradual decrease in the room temperature difference, as a result of which the passenger compartment is evenly kept comfortably air-conditioned.

According to another embodiment, the air conditioning system is provided with a solar radiation sensor for monitoring the intensity of solar radiation entering the passenger compartment according to which the temperature of the passenger compartment changes and upon which the passenger's feeling of hot or cool depends and controls the proportions of amounts of conditioning air that blow into the passenger compartment through the front air outlets and the ceiling opening according to intensities of solar radiation. For example, during cooling operation, the air conditioning system gradually reduces the amount of conditioning air blowing through the front air outlets and gradually increases the amount of conditioning air blowing through the ceiling opening when the solar radiation intensity is higher than a specified value and finally shuts off the conditioning air from the front air outlets and forces the whole amount of conditioning air to blow through the ceiling opening only so as to keep the entire area of the passenger compartment at a desired temperature evenly.

According to another embodiment, the air conditioning system includes a main blower which draws in recirculated air and/or outside air and a sub-blower which draws in recirculated air as the blower means, and a sub-air inlet which is provided in the conditioning air path and opens into the passenger compartment at a center of a floor of the passenger compartment. The sub-blower draws in recirculated air through the sub-air inlet. The air conditioning system changes the drawing of recirculated air by the sub-blower from a state wherein the recieculated air is drawn through the sub-air inlet to a state where the recieculated air is drawn through the ceiling opening and vice versa. The recirculated air discharged from the sub-blower is directed at least to the main blower. Specifically, the air conditioning system switches the drawing of recirculated air from a state wherein the blower draws recieculated air through the sub-air inlet, i.e recirculated air near the floor of the passenger compartment to a state where the sub-blower draws recieculated air through the ceiling opening, i.e. recirculated air near the ceiling of the passenger compartment and vice versa. Further, the place where the recirculated air that is discharged from the sub-blower is directed is switched between the main blower and the ceiling opening.

According to another embodiment, the conditioning air path comprises a pillar duct section which extends upward along a center pillar of the vehicle and is in communication with the ceiling opening at one of opposite ends of the pillar duct section and a main duct section which is connected at one of opposite ends to the main blower at an outlet side of the main blower and at another of the opposite ends to another end of the pillar duct section. A damper mechanism switches a flow of conditioning air in the conditioning air path. For example, in a state wherein the damper mechanism closes the recirculation duct section while closing the sub-inlet duct section at one end thereof and opening the sub-air inlet, recirculated air is drawn in by the sub-blower through the sub-air inlet and is directed toward the main blower through the sub-air discharge duct section. At the same time, air discharged from the main blower is forced to flow through the main duct section and the pillar duct section and blows into the passenger compartment through the ceiling opening. In another state where the damper mechanism closes the recirculation duct section while opening the sub-inlet duct section at another end thereof and closing the sub-air inlet, recirculated air is drawn by the sub-blower through the ceiling air inlet and is forced to flow through the pillar duct section and the sub-inlet duct section and then directed toward the main blower through the sub-air discharge duct section. At the same time, air discharged from the main blower is forced to flow through the main duct section and blows into the passenger compartment through the front air outlets of the instrument panel.

The pillar duct section may be provided one for each of opposite center pillars of the vehicle. The sub-blower may be disposed one at a center of a floor of the passenger compartment or otherwise, may be provided one at each side of a floor of the passenger compartment in connection with each pillar duct section.

The air conditioning system may be operative in an operation mode wherein the blower means draws recirculated air into the conditioning air path through at least the ceiling opening and blows the recirculated air into the passenger compartment after heating the recirculated air by the air temperature controlling means. Although during heating operation, it is generally that hot air is apt to stagnate in the upper part of the passenger compartment, nevertheless, in this embodiment, hot air is prevented from stagnating in the upper part of the passenger compartment because the recirculated air is drawn through the ceiling opening. Further, the air conditioning system may be operative in an operation mode wherein the blower means draws the recieculated air through at least the sub-air inlet and blows the recirculated air into the passenger compartment from the front of the passenger compartment toward passengers in the passenger compartment after heating or cooling the recirculated air by the air temperature controlling means. That is, after drawing recirculated air near the passengers, the recirculated air is heated or cooled and then forced to blow toward the passengers again, so that air around the passengers is effectively warmed up during heating operation or effectively cooled down during cooling operation.

According to still another embodiment, the air conditioning system is operative in an operation mode wherein the blower means draws the reciecculated air through the sub-air inlet and blows the recirculated air through defroster air outlets after heating the recirculated air by the air temperature controlling means. That is, in this operation mode, recirculated air is drawn in near the passengers and is forced to blow into the passenger compartment at a location far from the passengers. For example, when starting air conditioning the passenger compartment at a low room temperature while the vehicle stands in very cold whether, the air conditioning system operates in that operation mode, so as to forces out cool air in the conditioning air path toward a location far from the passenger.

The air conditioning system of the present invention produces various useful results. Specifically, because proportions of the amounts of conditioning air blowing through the ceiling opening and the front air outlets are properly regulated, it is possible to give the passengers feelings of cool by increasing the amount of conditioning air blowing through front air outlets or to keep the passenger compartment evenly cooled by increasing the amount of conditioning air blowing through ceiling opening, according to room conditions during cooling operation. This is because, since the human sense of cool is stronger at the top of the head than at the face, the passenger is made more comfortable by conditioning air blowing from the front of the passenger compartment than conditioning air blowing from the above of the head. In particular, the air conditioning system makes the passenger feel cool by increasing the amount of conditioning air blowing through the front air outlets when the difference of the room temperature of the passenger compartment from a desired temperature setting is large or when the intensity of solar radiation entering the passenger compartment is high. Further, as the temperature difference becomes smaller or as the intensity of solar radiation becomes lower while the air conditioning system decreases the amount of conditioning air blowing through the front air outlets, so as to prevent the passenger from being exposed directly to cold wind and feeling uncomfortable, it increases the amount of conditioning air blowing through the ceiling opening, so as to keep the passenger compartment comfortably air-conditioned.

While the air conditioning system causes cold conditioning air to blow into the passenger compartment, it forces hot air in the passenger compartment out of the vehicle, so that the passenger compartment is conditioned to gain a lower room temperature in a short period of time. Thereafter, while the air conditioning system gives the passenger a feeling of cool by increasing the amount of conditioning air blowing through the front air outlets or preventing the passenger from feeling uncomfortable by decreasing the amount of cold conditioning air blowing through the front air outlets which blows directly against the passenger, it keeps the passenger compartment comfortably air-conditioned by increasing the amount of conditioning air blowing through the ceiling opening. The air conditioning system draws recirculated air near the passenger through the sub-air inlet and directs it to the main blower, so that the air conditioning system draws hot air near the passenger and forces it to blow into the passenger compartment again after cooling, during cooling operation, or so that the air conditioning system draws cold air near the passenger and forces it to blow into the passenger compartment again after heating, during heating operation. Accordingly, air around the passenger is always controlled so as to be comfortable. Moreover, it is possible to direct recirculated air drawn through the ceiling opening to the main blower, so that the passenger compartment is prevented from encountering stagnation of hot air in the upper part with an effect of making the passenger feel far more comfortable during heating operation. Drawing recirculated air near the passenger makes it possible to rapidly control circumstances of the passenger, so as to provide a comfortable room condition in a short period of time.

The air conditioning system prevents cold air remaining in the conditioning air path from blowing against the passenger at the beginning of heating operation and, in consequence, the passenger feeling uncomfortable due to exposure of the cold air directly to the passenger. Further, because conditioning air blows through the ceiling opening, air conditioning of the passenger compartment is sufficiently accomplished even if no center air outlet is provided in the instrument panel. As a result, it is made possible to install an audio set, an air conditioner operating panel or an instrument such as a speed meter in a place where the center air outlet is conventionally provided, as a result of which the degree of freedom of designing a part of the instrument panel.

BRIEF DESCRIPTION OF THE DRAWINGS

The foregoing and other objects and features of the present invention will be clearly understood from the following detailed description of the desired embodiment thereof when read in conjunction with the accompanying drawings in which the same reference numerals have been used to denote same or similar parts or elements throughout the drawings, and wherein:

FIG. 6 is an illustration showing a cooling operation mode map;

FIG. 7 is a table showing door patterns for various cooling operation modes;

DETAILED DESCRIPTION OF THE PREFERRED EMBODIMENTS

Figure 1:
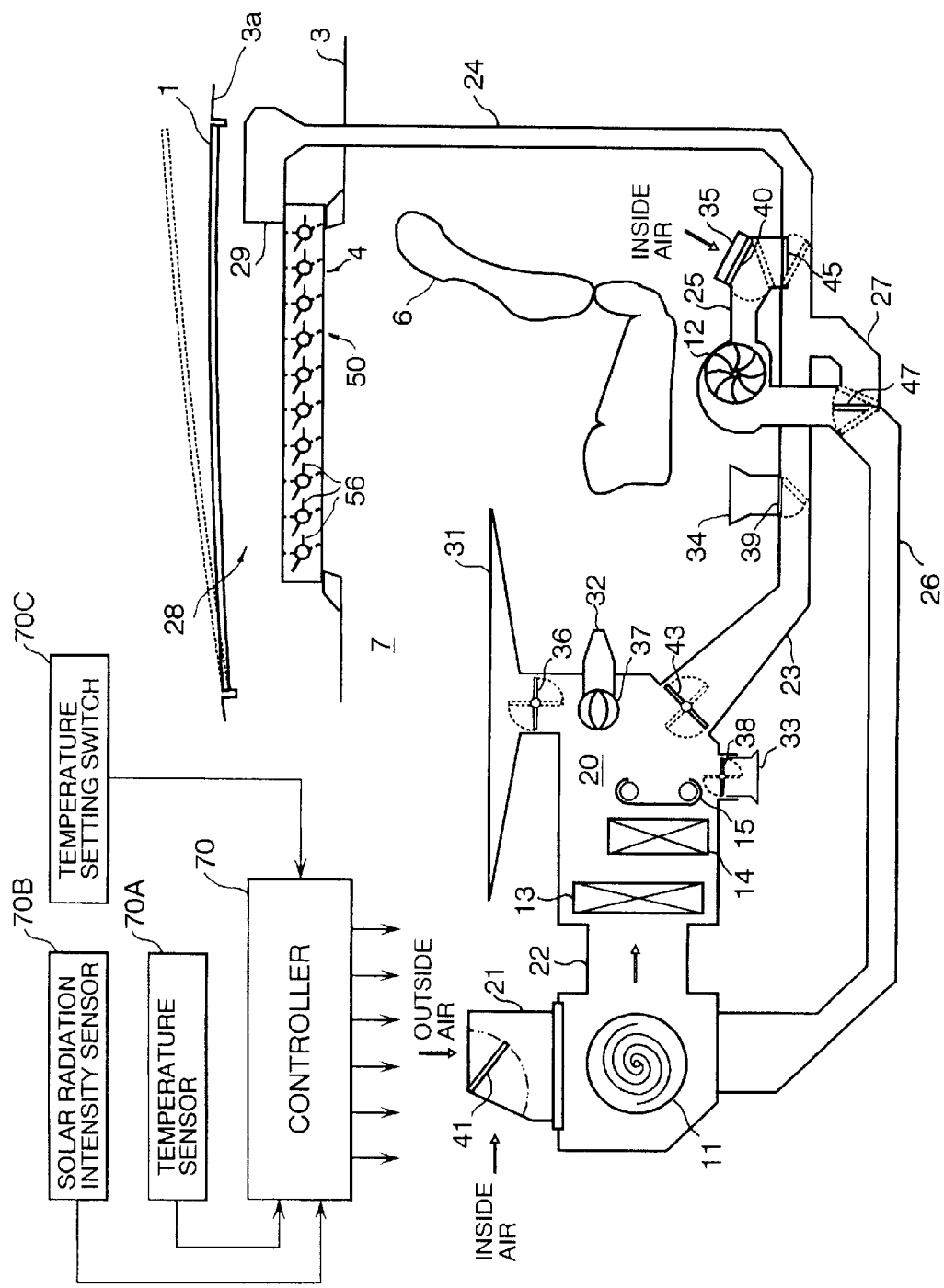
FIG. 1 is a schematic overall view of an air conditioning system according to an embodiment of the present invention.
Figure 2:
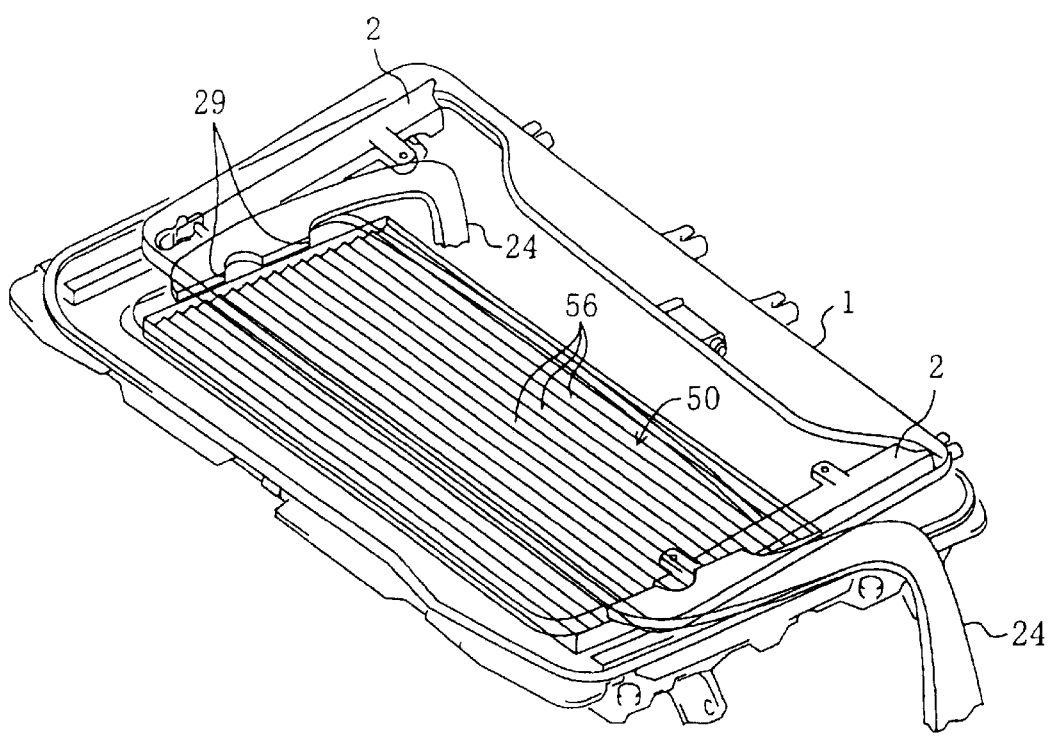
FIG. 2 is a perspective view of a sunroof and sunshade structure of the air conditioning system of FIG. 1.

Referring to the drawings in detail, in particular, to FIGS. 1 and 2 showing an air conditioning system according to a preferred embodiment of the invention, the air conditioning system is shown as installed in a vehicle equipped with a glass sunroof 1. As shown in detail in FIG. 2, the glass sunroof 1 is tilted up from and down to a top roof 3a by a tilt mechanism 2. A passenger compartment 7 has an inner ceiling 3 which is formed with a ceiling opening 4 in a position below the glass sunroof 1. The ceiling opening 4 forms a ceiling air outlet of the air conditioning system and is covered by an air controllable sunshade 50. The air conditioning system has blower means comprised of a main blower 11 and an sub-blower 12, temperature control means comprised of an evaporator 13 and a heater core 14, an air conditioning system controller 70 and an air duct assembly 20 comprised of a plurality of air ducts. The main blower 11, which is positioned in a front section of the passenger compartment 7, is connected with an air inlet assembly 21 having an ambient air inlet opening to the exterior of the vehicle and a recirculated or inside air inlet opening to the interior of the passenger compartment 7 and equipped with an air inlet control door 41 operative to change introduction of air to the main blower 11 between ambient air and recirculated or inside air. The main blower 11 at its air outlet side is connected with a main duct 22 in which an evaporator 13 and a heater core 14 are installed. Air discharged from the main blower 11 is cooled by the evaporator 13 or heated by the heater core 14 to produce blended outlet air.

The evaporator 13, which is disposed so as to cover the entire cross section of the main duct 22 and is connected to a compressor and a refrigerant pipe (both are not shown in the figure), makes heat exchange of air from the main blower 11 with the refrigerant to cool the air. The heater core 14, which is disposed downstream from the evaporator 13 so as to occupy partly the cross section of the main duct 22 and through which cooling water of an engine (not shown) flows, makes heat exchange of air from the main blower 11 with the cooling water to heat the air. The heater core 14 is equipped with a roll type of air mixing damper 15 operative to regulate the amount of air to pass through the heater core 14 so as to control the temperature of blended air. The main duct 22 at its one side downstream from the heater core 14 leads to a plurality of air outlets, such as defroster air outlets 31 for directing air toward a front wind shield, left and right side air outlets 32 and a center air outlet, if provided, for directing air toward passengers and lap or foot air outlets 33 for directing air toward feet of the passengers, formed in an instrument panel (not shown). The defroster air outlet 31 and the foot air outlet 33 are opened and closed by doors 36 and 38, respectively. The side, center and right air outlets 32 are adjustably opened by side registers 37, respectively, so as to control the amount of air and the direction of air stream. The main duct 22 is also connected with a floor duct 23 which extends along a floor panel (not shown) from the front to the center of the vehicle. The floor duct 23 is provided with a door 43 disposed at its upstream end and operative to open and close the floor duct 23 and a door 39 operative to open and close a floor air outlet 34 for directing air toward one side of a front seat 6. These main duct and floor duct 23 form a main air path. The floor duct 23 at its rear end branches off into two pillar ducts 24 which extends upward in center pillars 5 at opposite sides of the passenger compartment 7, respectively, and has an upper end outlet 29 opening to a roof air path 28 formed between the glass sunroof 1 and the sunshade 50 as shown in FIGS. 1 and 3.

The sub-blower 12, which is disposed behind a center console (not shown) in the passenger compartment 7, is connected with a recirculated air sub-inlet duct 25 leading to the floor duct 23 between the floor air outlet 34 and a juncture to the pillar duct 24. The recirculated air sub-inlet duct 25 has a door 45 disposed therein in close proximity to the floor duct 23, an a recirculated air sub-inlet 35 between the sub-blower 12 and the door 45, and an recirculated air inlet door 40 at the recirculated air sub-inlet 35. The door 45 closes to shut off the recirculated air sub-inlet duct 25 from the floor duct 23 or opens to bring the recirculated air sub-inlet duct 25 into communication with the pillar duct 24 through the floor duct 23. The recirculated air inlet door 40 opens and closes the recirculated air sub-inlet 35. The sub-blower 12 at its outlet side is connected with a sub-air discharge duct 26 leading to an inlet of the main blower 11. The sub-air discharge duct 26 and the floor duct 23 are in communication with each other through an air recirculation duct 27. Specifically, the recirculation duct 27 extends from the floor duct 23 between the floor air outlet 34 and the juncture at which the recirculated air sub-inlet duct 25 is connected to the floor duct 23 to the sub-air discharge duct 26. The air recirculation duct 27 has a door 47 disposed in close proximity to the sub-air discharge duct 26. The recirculation door 47, which functions as a damper, closes to shut off the air recirculation duct 27 from the sub-air discharge duct 26 and opens to bring the air recirculation duct 27 into communication with the sub-air discharge duct 26. These doors 40, 45 and 47 form air stream switching means.

The air conditioning system incorporates various sensors and switches (not shown) including at least a room temperature sensor 70A for detecting the room temperature of the passenger compartment 7, a solar radiation intensity sensor 70B for detecting the intensity or quantity of solar radiation and a temperature setting switch 70C for allowing passengers to set a desired room temperature of the passenger compartment 7. Outputs from these sensors and switches are sent to the air conditioning system controller 70. Further, the air conditioning system incorporates various programmed operating conditions with respect to room temperatures, room temperature settings and solar radiation intensity according to which the air conditioning system controller automatically controls the blowers 11 and 12 and the doors 38, 39, 41, 45 and 47 so as to provide a desired air condition.

Figure 3:
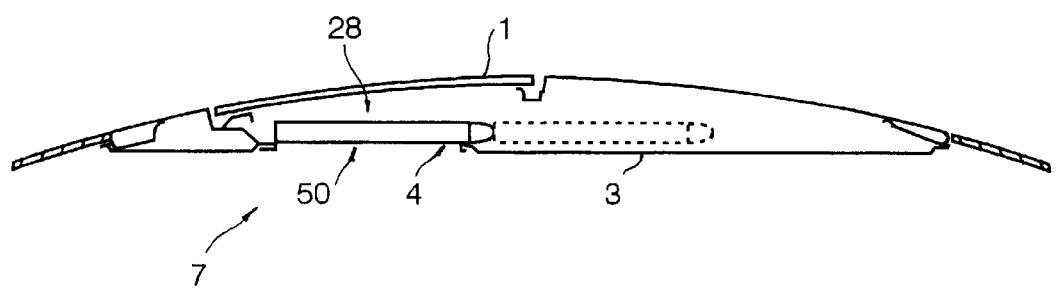
FIG. 3 a schematic side elevation view of the sunroof and sunshade structure.
Figure 4:
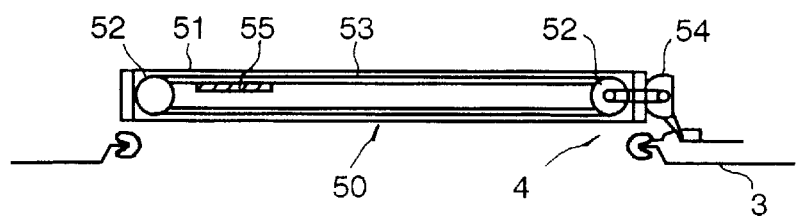
FIG. 4 is an enlarged view of the sunshade structure of FIG. 3.
Figure 5:
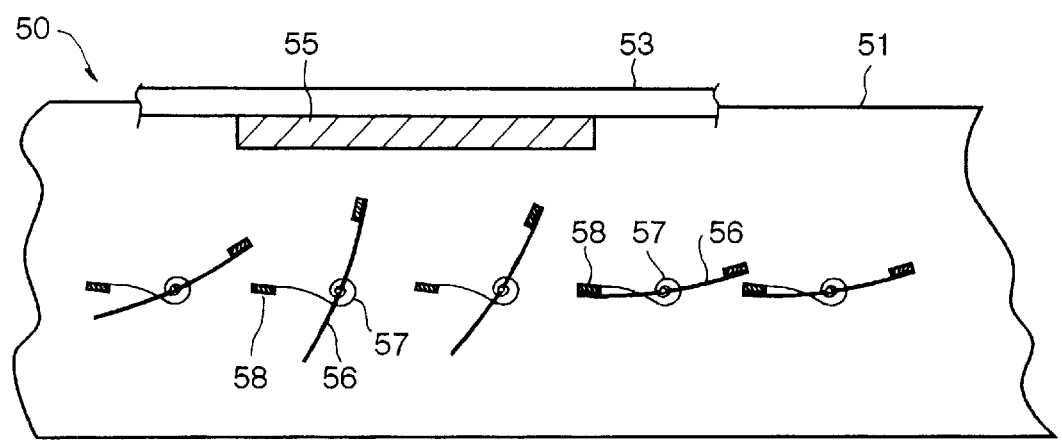
FIG. 5 is an enlarged view showing details of the sunshade structure of FIG. 3.

The sunshade 50, as shown in FIG. 2 and 3, comprises a number of louver blades or blind slats 56 shaped in narrow strips arranged so as to cover the entire opening of the ceiling air outlet (ceiling opening) 4. This sunshade 50 is movable between a closed position in which it closes the ceiling air outlet 4 and an open position in which it opens the entire opening of the ceiling air outlet 4 as shown by a double-dotted broken line in FIG. 3. As shown in detail in FIGS. 3 through 5, the sunshade 50 has a generally rectangularly-shaped frame 51 mating with the opening of the ceiling air outlet 4. As shown in FIG. 4, the frame 51 at opposite sides is provided with pulleys 52 at opposite ends in a lengthwise direction from the front to the back of the vehicle and a belt 53 mounted between the pulleys 52. Either one of the pulleys 52, namely the rear end pulley 52 in this embodiment, is driven by a reversible motor 54 mounted on the inner ceiling 3. The belt 53 is provided with a magnet (which is hereafter referred to a belt magnet) 55. As shown in FIG. 5, the louver blades 56 have a length approximately equal to the width of the opening of the ceiling air outlet 4 in a transverse direction from the right to the left and are arranged in the longitudinal direction. Each louver blade 56 is supported for rotation by the frame 51 and provided by a spring 57 so as to be forced to turn in one direction. The frame 51 is provided with the same number of stoppers 58 as the louver blades 56 so as to engage one ends, for example front edges, of the louvers 56, thereby restraining rotation of the spring urged louvers 56. While the spring urged louvers 56 are engaged by the respective stoppers 58, they hold their position approximately horizontally so as to close the opening of the ceiling air outlet 4 entirely. Each louver blade 56 at its another end is provided with a magnet (which is hereafter referred to as a louver magnet) 59 attractive to the belt magnet 55. While the belt 53 moves, the belt magnet 55 approaches one or two of the louver blades 56 and then attracts the louver magnets 59 of the louver blades 53 in close proximity to the belt magnet 55, so as to turn the louver blades 56 gradually up. At this time the remaining louver blades 56 with the front ends engaged by the respective stoppers 56 hold their horizontal position. As the belt 53 further moves, the belt magnet 55 leaves the louver blade 56, so that the louver blade 56 is turned back by the spring 57 until it is engaged by the stopper 56. In this manner, the roof air path 28 is brought into communication with the passenger compartment 7 by means of spaces formed between the louver blades 56 that are turned by the belt magnet 53. Since as the belt moves in the direction, adjacent louver blades 56 that form a space therebetween change one after another in order, so that the space moves in the longitudinal direction between the opposite ends of the frame 51. When the belt 51 moves to place the belt magnet 53 at each one end of the frame, all of the louver blades 56 remain turned back in their horizontal positions, so as to completely close the opening of the ceiling air output 4, thereby disconnecting communication of the ceiling air outlet 4 with the passenger compartment 7.

The following description will be directed to air-conditioning operation of the air conditioning system. During air-conditioning operation of the air conditioning system, the evaporator 13 causes heat exchange between air discharged from the main blower 11 and a refrigerant flowing therein, so as to provide conditioned cold air. On the other hand, the temperature of air is controlled by introducing engine cooling water into the heater core 14 and regulating the amount of air flowing into the heater core 14 by the air mixing damper 15. The air conditioning system is automatically changed in operating condition according to the difference between actual and desired room temperatures (room temperature difference) and solar radiation intensity on the basis of a cooling operation mode map shown in FIG. 6 which defines various operation modes with respect to room temperature difference and solar radiation intensity. Specifically, in the cooling operation mode map, C1, C2 and C3 operation modes are prepared for a higher, a medium and a lower range of solar radiation intensities for larger room temperature differences, respectively. Similarly, C4, C5 and C6 operation modes are prepared for the higher, the medium and the lower range of solar radiation intensities for medium room temperature differences, respectively. Further, M1/2 and M3 operation modes are prepared for a higher-to-medium and the lower range of solar radiation intensities for smaller room temperature differences, respectively. In the respective operation modes, the associated operating elements are controlled as shown in door pattern table I in FIG. 7. The terms "mode door A," "mode doors B" and "mode door C" as used in door pattern table I refer to the door 43 disposed in the floor duct 23, the doors 38, 39 and 45 disposed in the foot air outlet 33, disposed in the floor air outlet 34 and the recirculated air sub-inlet duct 25, respectively, and the door 36 in the defroster air outlet 31, respectively.

Figure 8:
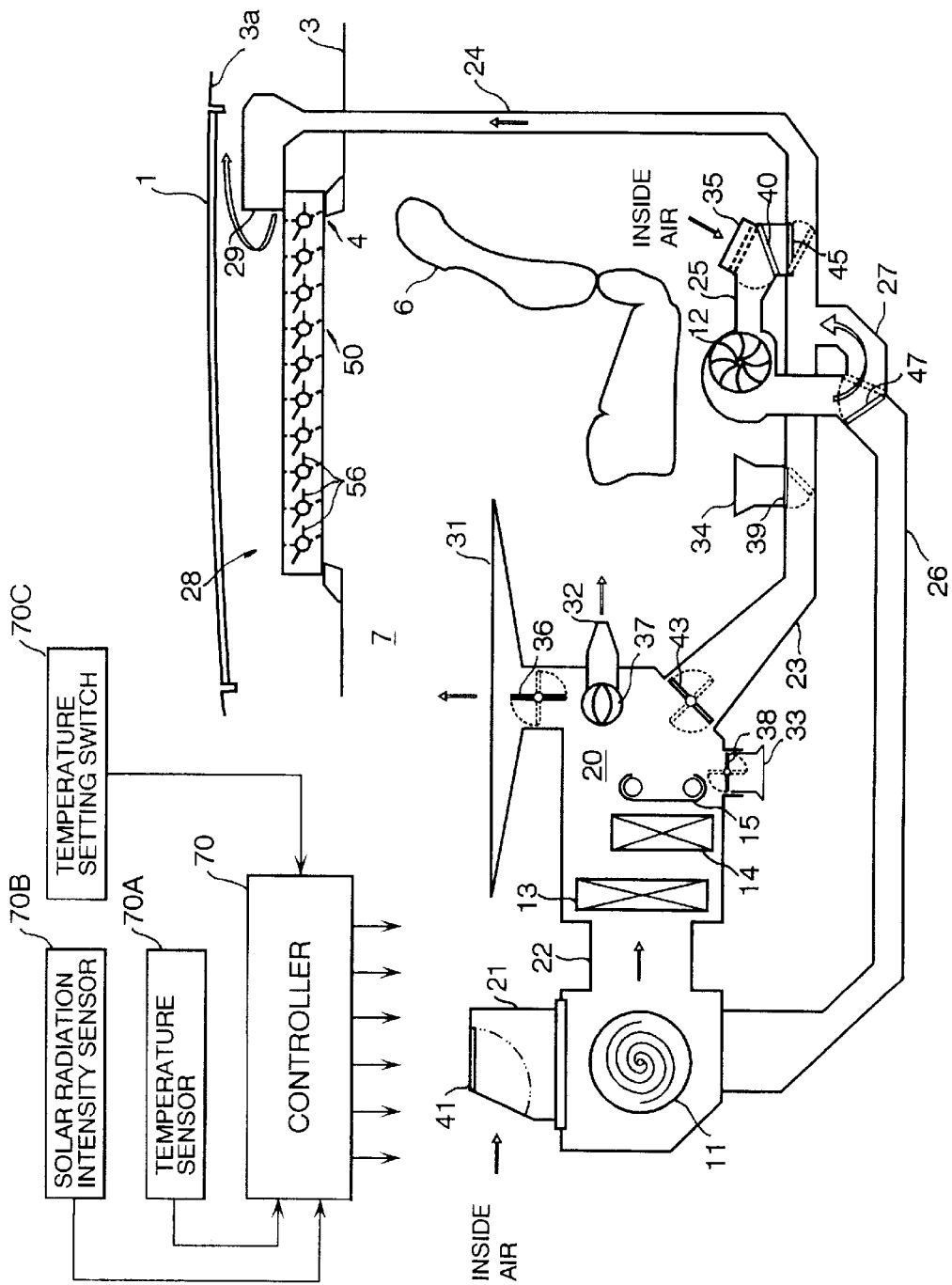
FIG. 8 is a schematic overall view of the air conditioning system in C1 operation mode.

In the C1 operation mode which is taken in order to force out hot air from the passenger compartment 7 and the ducts, the air conditioning system takes a door pattern shown in FIG. 8. As apparent in door pattern table I and FIG. 8, in the operation mode C1, the side register 37, the mode door C (the door 36), the recirculated air inlet door 40 and the recirculation door 47 remain open, and the mode door A (the door 43) and the mode doors B (the doors 38, 39, and 45) are closed. Further, the air inlet control door 41 is changed in position so as to introduce recirculated air into the main blower 11. On the other hand, the sunshade 50 is closed, and the glass sunroof 1 is tilted up. In this state, recirculated air introduced into the main blower 11 is cooled in the evaporator 13 and thereafter blows into the passenger compartment 7 through the defroster air outlets 31 and the side air outlets 32. Recirculated air introduced into the sub-blower 12 through the recirculation air sub-inlet 35 blows into the roof air path 28 through the air recirculation duct 27 and the center pillar ducts 24 and then forced out from the passenger compartment 7 through the glass sunroof 1 that is in the tilt up position. That is to say, when the solar radiation intensity is high while the room temperature difference is in the larger range, while the passenger compartment 7 is supplied with conditioned cold air, hot air in the passenger compartment 7 is forced out from the passenger compartment 7. Moreover, since the sunshade 50 is closed, although the solar radiation intensity is high, sun light passing through the glass sunroof 1 is isolated from the passenger compartment 7. Accordingly, in the operation mode C1, hot air accumulated in the passenger compartment 7 and the ducts is forced out of the vehicle. In this instance, the air conditioning system is forced to operate in the C2 operation mode after operation in the C1 operation mode for a specified period, for instance 30 seconds, from a start of air-conditioning.

Figure 9:
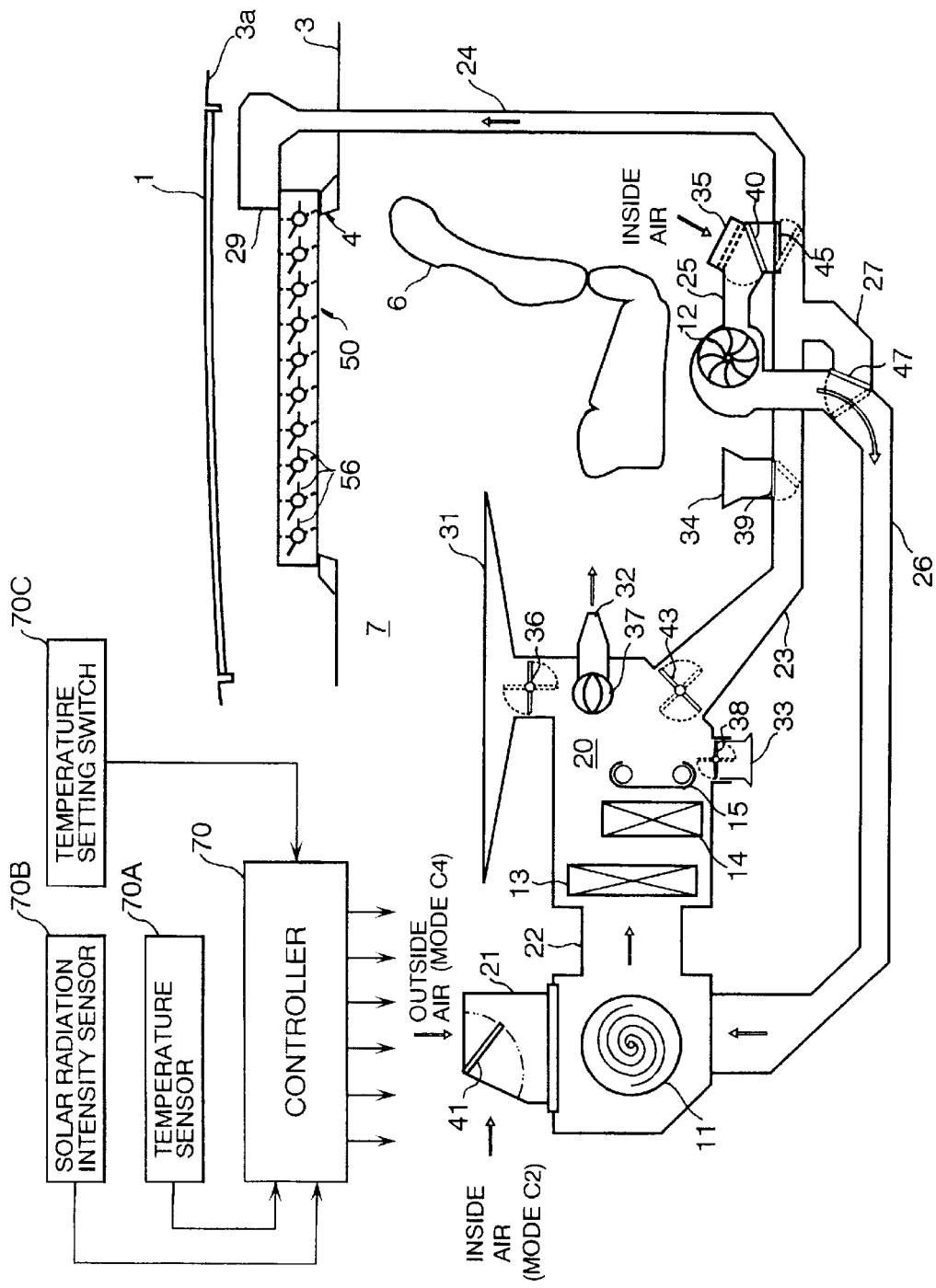
FIG. 9 is a schematic overall view of the air conditioning system in C2 and C4 operation modes.

In the C2 operation mode which is taken in order to quickly air-condition around the passengers, the air conditioning system takes a door pattern shown in FIG. 9. As apparent in door pattern table I and FIG. 9, in the operation mode C2, the air conditioning system is changed in state from the state in the C1 operation mode by closing the recirculation door 47 and glass sunroof 1. The remaining registers, doors and sunshade remain unchanged in position. In this state, recirculated air introduced into the sub-blower 12 through the recirculated air sub-inlet 35 flows into the main blower 11 through the sub-air discharge duct 26. The main blower 11 blends the recirculated air from the sub-blower 12 and the recirculated air introduced thereto through the recirculated air inlet of the main inlet assembly 21 and discharges the blended air. The blended air is cooled down in the evaporator 13 and subsequently blows into the passenger compartment 7 through the defroster air outlets 31 and the side air outlets 32. Accordingly, while the passenger compartment 7 is under larger room temperature differences in the medium range of solar radiation intensities, the passenger compartment 7 is isolated from sun light by the sunshade 50 and is supplied with conditioned cold air.

Figure 10:
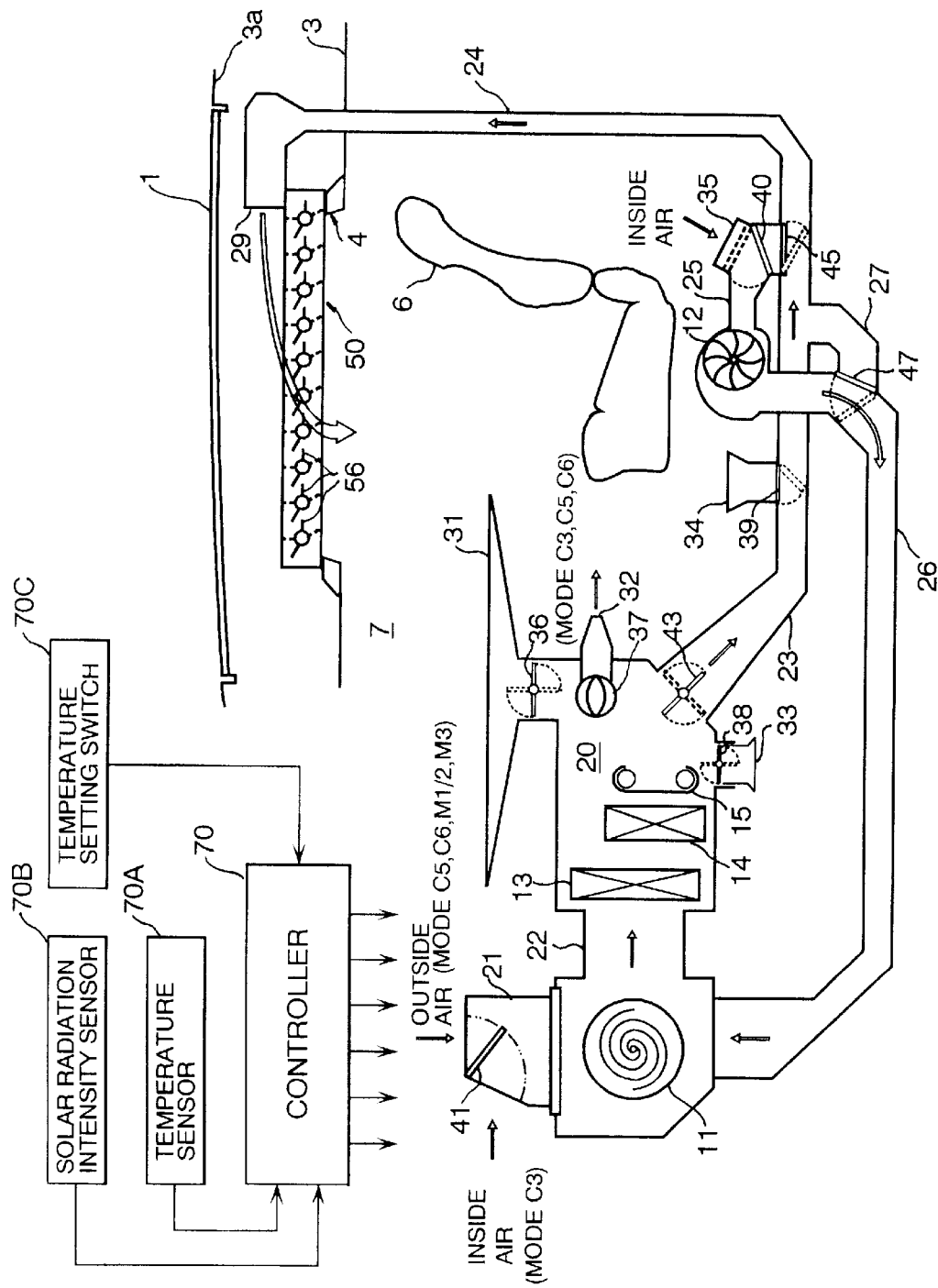
FIG. 10 is a schematic overall view of an air conditioning system in C3, C5, C6, M1/2 and M3 operation modes.

In the C3 operation mode which is taken in order to mode the passenger compartment 7 comfortably air-conditioned, the air conditioning system takes a door pattern shown in FIG. 10. As apparent in door pattern table I and FIG. 10, in the operation mode C3, the air conditioning system is changed in state from the state in the C2 operation mode by closing the mode door C (the door 36) and opening the mode door A (the door 43). In the C3 operation mode, the sunshade 50 is in a state where the motor 54 is actuated to move the belt magnet 55 so as to progressively turn up and down the louver blades 56, thereby bringing partly the roof air path 28 into communication with the passenger compartment 7 through the ceiling air outlet 4. The remaining registers and doors remain unchanged in position. In this state, recirculated air introduced into the sub-blower 12 through the recirculated air sub-inlet 35 flows into the main blower 11 through the sub-air discharge duct 26. The main blower 11 blends the recirculated air from the sub-blower 12 and the recirculated air introduced thereto through the recirculated air inlet of the main inlet assembly 21 and discharges the blended air. The blended air is cooled down in the evaporator 13 and blows partly into the passenger compartment 7 through the side air outlets 32 and partly into the floor duct 23. The cold air flowing in the floor duct 23 is directed into the roof air path 28 through the center pillar ducts 24 and then blows into the passenger compartment 7 passing through the shifting spaces between the louver blades 26 of the sunshade 50. As the belt magnet 55 moves, while the louver blades 56 are progressively turned up and down so as to shift the space, each louver blade 56 changes an angle of inclination thereof, so as to change the direction of air blow. Accordingly, while the passenger compartment 7 is under larger room temperature differences in the lower range of solar radiation intensities, the passenger compartment 7 is isolated from sun light by the sunshade 50 partly opened and is supplied with conditioned cold air from the ceiling air outlet 4.

In the C4 operation mode which is taken in order to quickly air-condition around the passengers, the air conditioning system takes a door pattern shown in FIG. 9. As apparent in door pattern table I and FIG. 9, in the operation mode C4, the air conditioning system is changed in state from the state in the C2 operation mode by switching the air inlet control door 41 so as to introduce ambient air into the main blower 11. The remaining registers, doors and sunshade remain unchanged in position for the C2 operation mode. Accordingly, in the C4 operation mode, the air conditioning system operates in the same way as in the C2 operation mode with an exception of introducing ambient air through the main air inlet assembly 21 and while the passenger compartment 7 is under medium room temperature differences in the higher range of solar radiation intensities, the passenger compartment 7 is isolated from sun light by the sunshade 50 and is supplied with cooled ambient air.

In the C5 operation mode which is taken in order to mode the passenger compartment 7 comfortably air-conditioned, the air conditioning system takes a door pattern shown in FIG. 10. As apparent in door pattern table I and FIG. 10, in the operation mode C5, the air conditioning system is changed in state from the state in the C3 operation mode by switching the air inlet control door 41 so as to introduce ambient air into the main blower 11. The remaining registers, doors and sunshade remain unchanged in position for the C3 operation mode. Accordingly, in the C5 operation mode, the air conditioning system operates in the same way as in the C3 operation mode with an exception of introducing ambient air through the main air inlet assembly 21 and while the passenger compartment 7 is under medium room temperature differences in the medium range of solar radiation intensities, the passenger compartment 7 is isolated from sun light by the sunshade 50 partly opened and is supplied with conditioning air from the ceiling air outlet 4.

In the C6 operation mode which is taken in order to mode the passenger compartment 7 comfortably air-conditioned, the air conditioning system takes a door pattern shown in FIG. 10. As apparent in door pattern table I and FIG. 10, in the C6 operation mode, the air conditioning system is changed in state from the state in the C5 operation mode by putting the sunshade 50 in the open position so as to entirely uncover the opening of the ceiling air outlet 4. The remaining registers, doors and sunshade remain unchanged in position for the C5 operation mode. Accordingly, in the C6 operation mode, the air conditioning system operates in the same way as in the C4 operation mode with an exception of supplying conditioning air with an exception that the conditioning air blows into the passenger compartment 7 passing directly through the opening of the ceiling air outlet 4. That is, while the passenger compartment 7 is under medium room temperature differences in the lower range of solar radiation intensities, the passenger compartment 7 receives sun light as much as possible through the glass sunroof 1 and is supplied with conditioned ambient air.

In the M1/2 operation mode which is taken in order to mode the passenger compartment 7 comfortably air-conditioned, the air conditioning system takes a door pattern shown in FIG. 10. As apparent in door pattern table I and FIG. 10, in the M1/2 operation mode, the air conditioning system is changed in state from the state in the C5 operation mode by closing the side register 37. The remaining doors and sunshade remain unchanged in position for the C5 operation mode. Accordingly, in the M1/2 operation mode, no air blows through the side outlets 32 and the whole conditioning air blows into the passenger compartment 7 through the sunshade 50 with the louver blades 56 progressively turned up. That is, while the passenger compartment 7 is under smaller room temperature differences in the higher-to-medium range of solar radiation intensities, the passenger compartment 7 is isolated from sun light by the sunshade 50 partly opened and is supplied with conditioning air from the ceiling air outlet 4.

In the M3 operation mode which is taken in order to mode the passenger compartment 7 comfortably air-conditioned, the air conditioning system takes a door pattern shown in FIG. 10. As apparent in door pattern table I and FIG. 10, in the M3 operation mode, the air conditioning system is changed in state from the state in the C6 operation mode by closing the side register 37. The remaining registers, doors and sunshade remain unchanged in position for the C6 operation mode. Accordingly, in the M3 operation mode, no air blows through the side outlets 32 and the whole conditioning air blows into the passenger compartment 7 through the sunshade 50 with the louver blades 56 progressively turned up. That is, while the passenger compartment 7 is under smaller room temperature differences in the lower range of solar radiation intensities, the passenger compartment 7 receives sun light as much as possible through the glass sunroof 1 and is supplied with conditioning air through the ceiling air outlet 4 fully opened.

Further, in these C3, C5, C6, M1/2 and M3 operation modes, quantities of air blowing through the recirculated air sub-inlet 35 and the ceiling air outlet are appropriately controlled by, specifically, increasing the quantity of air blowing through the ceiling air outlet 4 while reducing the quantity of air blowing through the recirculated air sub-inlet 35 as the room temperature difference is reduced and/or as the solar radiation intensity is lowered.

Although, as described above, in the event where the room temperature difference is larger and the solar radiation intensity is higher, the air conditioning system is operated in the C2 operation mode after operation in the C1 operation mode for a specified period, i.e. 30 seconds, from a start of air-conditioning, the air conditioning system may be otherwise operated in a different manner as described below.

Specifically, in the event where the room temperature difference is larger and the solar radiation intensity is higher at the beginning of operation, the air conditioning system is changed in state by closing the side register 37, the mode door C (door 36) and the mode doors B (the doors 38, 39 and 39), opening the mode door A (the door 43), the recirculated air inlet door 40 and the recirculation door 47 and switching the air inlet control door 41 to introduce recirculated air. Further the sunshade 50 is closed and the glass sunroof 1 is tilted up. In this state, recirculated air introduced into the sub-blower 12 through the recirculated air sub-inlet 35 flows into the main blower 11 through the sub-air discharge duct 26. The main blower 11 blends the recirculated air from the sub-blower 12 and recirculated air introduced thereto through the recirculated air inlet of the main inlet assembly 21 and discharges the blended air. The blended air thereafter flows into the roof air path 28 through the main duct 22, the floor duct 23 and the pillar ducts 24 and is discharged out of the vehicle through a space formed between the glass sunroof 1 tilted up and the top roof 3a. The air conditioning system operates in this state for, for example, 10 seconds and subsequently operates in the C1 operation mode for 20 seconds and subsequently in the C2 operation mode for 20 seconds in this order and then is changed into the C2 operation mode.

Figures 11, 12:
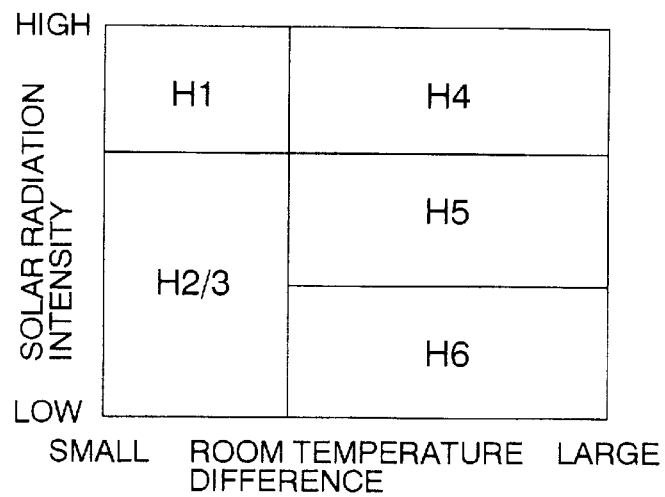
FIG. 11 is an illustration showing a heating operation mode map.
FIG. 12 is a table showing door patterns for various heating operation modes.

In the heating operation of the air conditioning system, while engine cooling water is introduced into the heater core 14 and, however, no refrigerant is introduced into the evaporator 13. Air discharged from the main blower 11 is heated by means of heat exchange with the engine cooling water and converted to warm air. Air flowing through the heater core 14 is controlled in quantity by the air mixing damper 15 so as to regulate the temperature of the hot air, thereby conditioning the hot air. Moreover, the air conditioning system is automatically changed in operating condition according to room temperature difference and solar radiation intensity on the basis of a heating operation mode map such as shown in FIG. 11 which defines various operation modes with respect to room temperature difference and solar radiation intensity. Specifically, in the heating operation mode map, H4, H5 and F6 operation modes are prepared for a higher, a medium and a lower range of solar radiation intensities for larger room temperature differences, respectively. Further, H1 and H2/3 operation modes are prepared for a higher and a medium-to-lower range of solar radiation intensities for smaller room temperature differences, respectively. In the respective operation modes, the associated operating elements are controlled as shown in door pattern table II in FIG. 12. The terms "mode door A," "mode doors B" and "mode door C" as used in Table II refer to the same doors as specified in Table I shown in FIG. 8.

Figure 13:
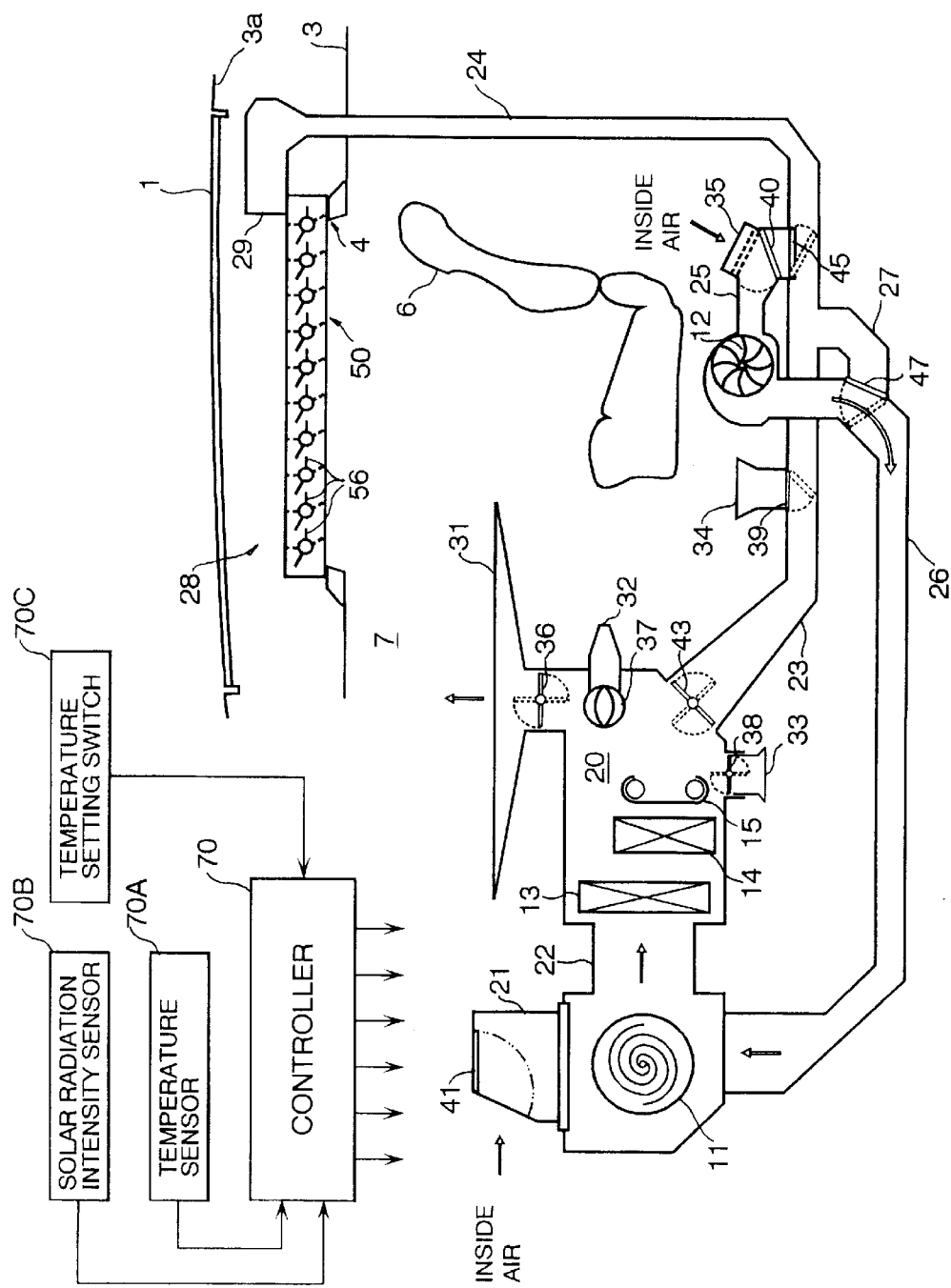
FIG. 13 is a schematic overall view of the air conditioning system in H6 operation mode.

In the H6 operation mode which is taken in order to force out cold air accumulated in the ducts, the air conditioning system takes a door pattern shown in FIG. 13. As apparent in door pattern table II and FIG. 13, in the operation mode H6, the side register 37, the mode doors" (the doors 38, 39, 45) and the recirculation door 47 are closed, and the mode door C (the door 36), the mode door A (the door 43) are opened. Further, the air inlet control door 41 is changed in position so as to introduce recirculated air into the main blower 11. On the other hand, the sunshade 50 is closed, and the glass sunroof 1 is tilted down. In this state, recirculated air introduced into the sub-blower 12 through the recirculated air sub-inlet 35 flows into the main blower 11 through the sub-air discharge duct 26. The main blower 11 blends the recirculated air from the sub-blower 12 and recirculated air introduced thereto through the recirculated air inlet of the main inlet assembly 21 and discharges the blended air. The blended air thereafter is heated in the heater core 24 and then blows into the passenger compartment 7 through the defroster air outlets 31. That is, while the passenger compartment 7 is under larger room temperature differences in the lower range of solar radiation intensities, recirculated cold air that is introduced in from the passenger compartment 7 and heated by the heater core 14 blows into the passenger compartment 7 through the defroster air outlets 31 apart from the passengers. In this instance, the air conditioning system operates for a specified period of time, for example 30 seconds, in the H6 operation mode immediately after a start of operation and thereafter forced to operate in the H5 operation mode.

Figure 14:
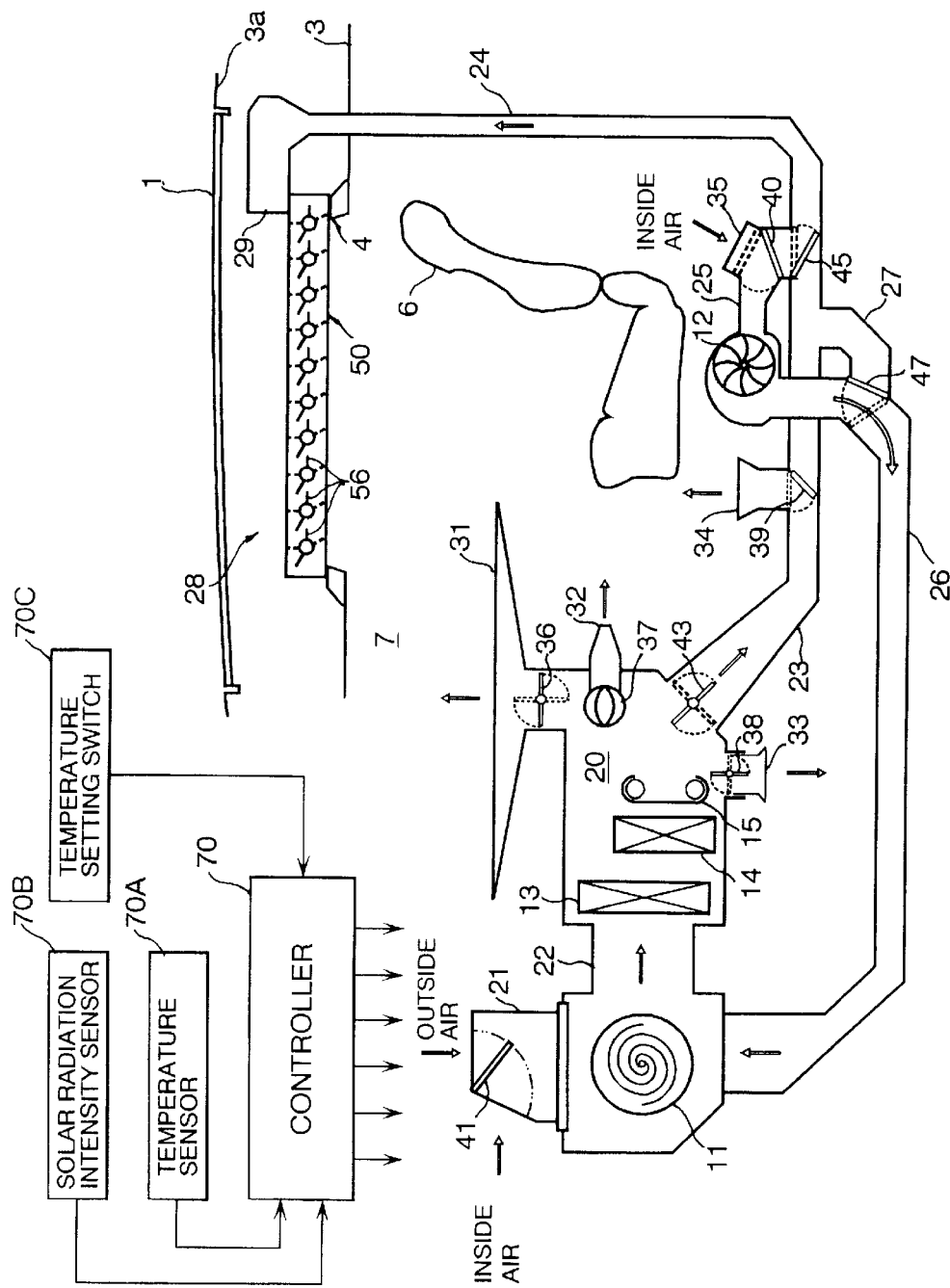
FIG. 14 is a schematic overall view of the air conditioning system in H5 operation mode.

In the H5 operation mode which is taken in order to quickly air-condition around the passengers, the air conditioning system takes a door pattern shown in FIG. 14. As apparent in door pattern table II and FIG. 14, in the operation mode H5, the air conditioning system is changed in state from the state in the C1 operation mode by opening the side register 37 and the mode doors B (the doors 38, 39, 45) and switching the air inlet control door 41 in position so as to introduce recirculated air and/or ambient air into the main blower 11. The remaining doors and sunshade remain unchanged in position. In this state, recirculated air introduced into the sub-blower 12 through the recirculated air sub-inlet 35 flows into the main blower 11 through the sub-air discharge duct 26. The main blower 11 blends the recirculated air from the sub-blower 12 and the recirculated air and/or the ambient air introduced thereto through the air inlets of the main inlet assembly 21 and discharges the blended air. The blended air is heated in the heater core 14 and subsequently blows into the passenger compartment 7 through the defroster air outlets 31, the side air outlets 32 and foot air outlets 33 and also through floor air outlet 34 leading from the floor duct 23. Accordingly, while the passenger compartment 7 is under larger room temperature differences in the medium range of solar radiation intensities, the passenger compartment 7 is evenly supplied with conditioned warm air. In this instance, in the H5 operation mode, only recirculated air may be introduced into the main blower 11.

Figure 15:
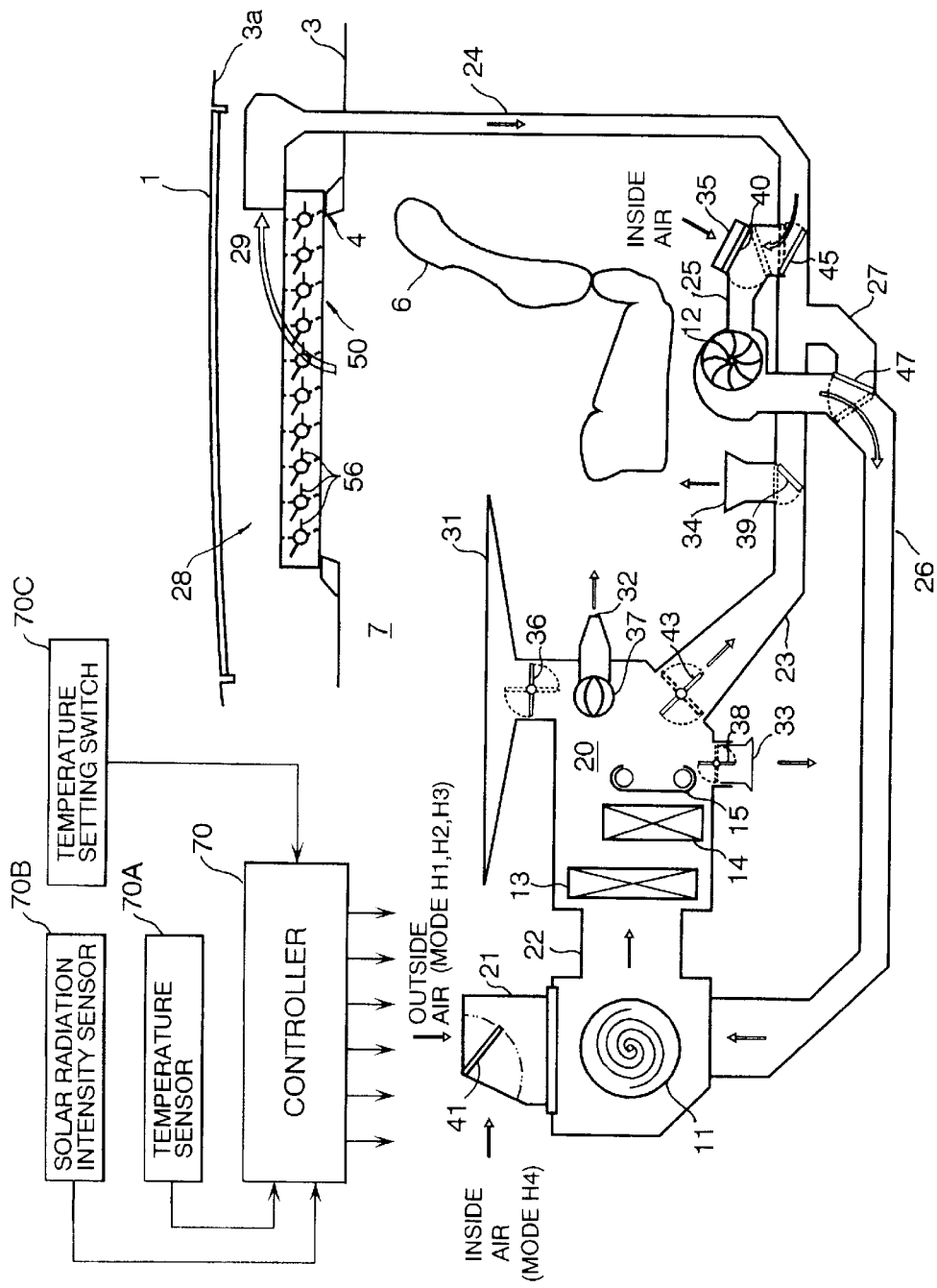
FIG. 15 is a schematic overall view of an air conditioning system in H5, H1, H2/3 operation modes.

In the H4 operation mode which is taken in order to keep the passenger compartment 7 comfortably warmed up, the air conditioning system takes a door pattern shown in FIG. 15. As apparent in door pattern table II and FIG. 15, in the operation mode H4, the air conditioning system is changed in state from the state in the H5 operation mode by closing the mode door C (the door 36) and the recirculated air inlet door 40. In the H4 operation mode, the sunshade 50 is in the open position to fully open the ceiling air outlet 4. The remaining registers and doors remain unchanged in position. In this state, recirculated air introduced into the sub-blower 12 through the pillar duct 24 and the a recirculated air sub-inlet duct 25 via the ceiling air outlet 4 is directed to the main blower 11 through the sub-air discharge duct 26. The main blower 11 blends the recirculated air from the sub-air discharge duct 26 and the recirculated air or outside air introduced thereinto through the main inlet assembly 21 and discharges the blended air. The blended air is heated in the heater core 14 and blows into the passenger compartment 7 through the defroster air outlets 31, the side air outlets 32, the foot air outlet 33 and the floor air outlet 34 in the same way as in the H5 operation mode. That is, while the passenger compartment 7 is under large room temperature differences in the higher range of solar radiation intensities, while the passenger compartment 7 receives sun light as much as possible through the glass sunroof 1 and is supplied with cold conditioning air.

In the H2/3 operation mode which is taken in order to keep the passenger compartment 7 comfortably warmed up, the air conditioning system takes a door pattern shown in FIG. 15. As apparent in door pattern table II and FIG. 15, in the H2/3 operation mode, the air conditioning system is changed in state from the state in the H4 operation mode by switching the air inlet control door 41 so as to introduce outside air into the main blower 11. The remaining doors and sunshade remain unchanged in position for the H4 operation mode. Accordingly, in the H2/3 operation mode, the air conditioning system operates in the same way as in the C2 operation mode with an exception that the main blower draws outside air through the air inlet assembly 21. That is, while the passenger compartment 7 is under middle room temperature differences in the lower-to-medium range of solar radiation intensities, while the passenger compartment 7 receives sun light as much as possible through the glass sunroof 1 and is supplied with heated outside air.

In the H1 operation mode which is taken in order to keep the passenger compartment 7 comfortably warmed up, the air conditioning system takes a door pattern shown in FIG. 15. As apparent in door pattern table II and FIG. 15, in the H1 operation mode, the air conditioning system is changed in state from the state in the H2/3 operation mode to a state wherein the motor 54 is actuated to move the belt magnet 55 of the sunshade 50 so as to progressively turn up and down the louver blades 56, thereby bringing partly the roof air path 28 into communication with the passenger compartment 7 through the ceiling air outlet 4. The remaining registers and doors remain unchanged in position for the H2/3 operation mode. Accordingly, in the H1 operation mode, the air conditioning system operates in the same way as in the H2/3 operation mode with an exception that the passenger compartment 7 receives sun light through the sunroof 1 and the sunshade 50. That is, while the passenger compartment 7 is under medium room temperature differences in the higher range of solar radiation intensities, while the passenger compartment 7 is isolated from sun light passing through the sunroof 1 by the sunshade 50 which is only partly opened, recirculated air is drawn through the ceiling air outlet 4.

In the air conditioning for heating or cooling the passenger compartment 7, the air conditioning system automatically switches the sunshade 50 between the closed state and the partly open state and between the closed position and the open position. However, it may be manually done to switch the sunshade 50 between these state and between these positions.

With the air conditioning system according to the above embodiment, conditioning air blows through the ceiling air outlet 4, so that the upper part of the passenger compartment 7, i.e. the part of the passenger compartment around the head of the passenger, is efficiently cooled with an effect of giving the passenger an improved feeling of comfort. Further, the sunshade 50 thus structured enables to change the blowing position and direction of conditioning air through the ceiling air outlet 4. Accordingly, the conditioning air blowing through the ceiling air outlet 4 is distributed all around in all directions in the passenger compartment 7 with the result of preventing the passenger feeling uncomfortable due to conditioning air blow in a limited direction, and the passenger compartment is evenly air-conditioned, so as to improve the passenger's feeling of comfort. Moreover, recirculated air around the passenger is drawn through the recirculated air sub-inlet 35 and directed to the main blower 11, so that, on one hand, hot air near the passenger is drawn and forced to blow into the passenger compartment 7 after cooling, during cooling operation and, on the other hand, cold air near the passenger is drawn and forced to blow again into the passenger compartment 7 after heating during heating operation. Accordingly, the passenger compartment 7 near the passenger is certainly and comfortably air conditioned. Because recirculated air drawn through the ceiling air outlet 4 is directed to the main blower 11, hot air is prevented from stagnating in the upper part of the passenger compartment 7, i.e. the part of the passenger compartment 7 around the head of the passenger. Further, at the beginning of cooling operation, while cold air blows into the passenger compartment 7, hot air in the passenger compartment 7 is forced out of the passenger compartment 7, so that the passenger compartment 7 can be cooled in a short period of time. In addition, because the air conditioning system is operated in various operation modes according to room temperature differences and solar radiation intensities, the passenger compartment 7 is air conditioned far more comfortably according appropriately to room conditions. Moreover, because conditioning air blows through the ceiling air outlet 4, air conditioning of the passenger compartment 7 is sufficiently accomplished even if no center air outlet is provided in the instrument panel. As a result, it is made possible to install an audio set, an air conditioner operating panel or an instrument such as a speed meter in a place where the center air outlet is conventionally provided, as a result of which the degree of freedom of designing a part of the instrument panel.

Figure 16:
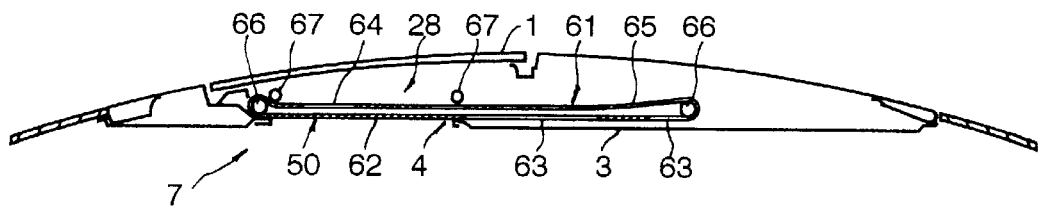
FIG. 16 is a side elevation view of a variation of the sunroof and sunshade structure.
Figure 17:
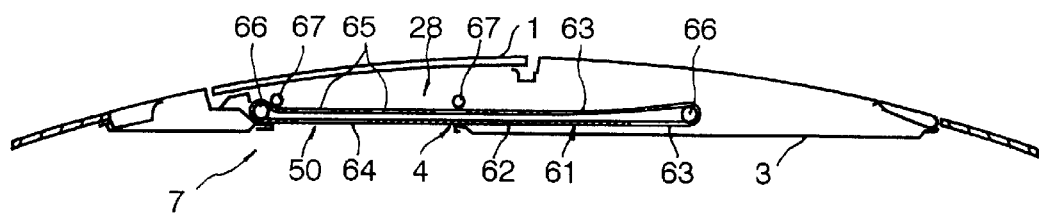
FIG. 17 is a side elevation view of the variation of the sunroof and sunshade structure which is in a communication state.
Figure 18:
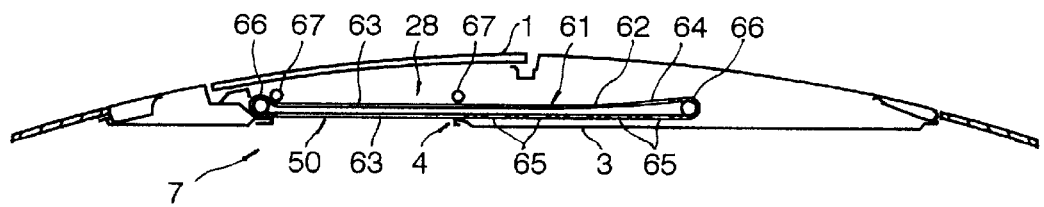
FIG. 18 is a side elevation view of the variation of the sunroof and sunshade structure which is in a fully state.

Referring to FIGS. 16 through 18 showing a variation of the sunshade 50 incorporated in the air conditioning system of the invention, the sunshade 50 includes an endless sunshade screen 61 which is mounted between a pair of main rollers 66 separated from each other and tensioned downward by a pair of sub-rollers 67. Each of these rollers 66 and 67 is capable of rotating on an axis extending transversely in the ceiling opening (ceiling air outlet) 4. One of the main rollers 66, namely a drive roller which is driven by a motor (not shown), is disposed out of the ceiling air outlet 4 adjacently to the rear end of the ceiling air outlet 4, and another main roller 66, namely an idler roller, is disposed in the ceiling air outlet 4 in close proximity to the front end of the ceiling air outlet 4. Each of the sub-rollers 67, which has a diameter smaller than that of each main roller 66, is capable of rotating on an axis extending in parallel to the axis of rotation of the main rollers 66. The endless sunshade screen 61 comprises a fabric screen 62 having a transverse width substantially equal to or greater than the transverse width of the ceiling air outlet 4 and formed with a plurality of transverse air slots, namely two air slots 63, one air slot 64 and four air slots 65. These air slots 63, 64 and 65 have a transverse length extending approximately along the full transverse width of the ceiling air outlet 4 and are greater in width in the lengthwise direction of the ceiling air outlet 4 in this order. Specifically, the narrower air slots 65 are arranged at regular distances in the lengthwise direction of the fabric screen 62 so that at least more-than-two narrower air slots 65 are always positioned within the ceiling air outlet 4. As shown in FIG. 17, the middle air slot 64 is arranged so as to be always positioned in an under section of the endless sunshade screen 61 when at least one of the narrower air slots 65 is positioned in an upper section of the endless sunshade screen 61. As the endless sunshade screen 61 is moved by and between the main rollers 66, the middle air slot 64 progressively overlaps with the respective narrower sir slots 65 one after another, so that the roof air path 28 is intermittently brought into communication with the passenger compartment 7. The wider air slots 63 are directly adjacent to each other and have the same width as the length of the ceiling air outlet 4. As shown in FIG. 18, these wider air slots 63 are arranged so that when either one of them is positioned in the upper section of the endless sunshade screen 61 within the ceiling air outlet 4, another one is always positioned in the under section of the endless sunshade screen 61 within the ceiling air outlet 4. Accordingly, when either one of the wider air slots 63 is positioned within the ceiling air outlet 4, the ceiling air outlet 4 is always fully opened. The endless sunshade screen 61 has parts wherein no air slot is formed so that the roof air path 28 is isolated from communication with the passenger compartment 7 when at least such a part is positioned in the ceiling air outlet 4 as shown in FIG. 16.

Likely in the previous embodiment, the air conditioning system equipped with the sunshade 50 shown in FIGS. 16 through 18 is operated in various operation modes according to room conditions. In this instance, the sunshade 50 is switched between various states, namely a closed state wherein the ceiling air outlet 4 is fully closed to isolate the roof air path 28 from the passenger compartment 7, a communication state wherein the ceiling air outlet 4 is partly opened to bring the roof air path 28 intermittently into communication with the passenger compartment 7 and an open state wherein the ceiling air outlet 4 is fully opened to bring the roof air path 28 into communication with the passenger compartment 7.

In place of the endless sunshade screen 62, a screen formed with a plurality of appropriate air slots may be installed so that the screen is unwound from one of a pair of rollers disposed at opposite ends of the ceiling air outlet 4 and wound on another of the rollers so as thereby to place the air slots necessary to put the ceiling air outlet 4 selectively in the closed state, the communication state and the open state. If the vehicle is not equipped with the sunroof 1, an air blow controller such as the sunshade 50 may be installed in the ceiling opening (ceiling air outlet) 4 such that a roof air path 28 is provided between the air blow controller so as to lead to the pillar duct 24 at the upper end outlet 29. In this instance, the air conditioning system is operative in all possible operation modes excepting the C1 operation mode wherein hot air is discharged through the sunroof tilted up. Further, motor driven louvers may be installed as an air blow controller in the pillar duct 24 at the upper end outlet 29. In this instance, the motor driven louvers are respectively disposed at the ceiling opening 4 formed in the ceiling 3 below the sunroof 1 and the upper end outlet 29 of the pillar duct 24 which are formed in combination as a ceiling air outlet. In this variation, even when the ceiling air outlet 4 which is formed as an opening in the ceiling 3 below the sunroof 1 is fully opened, conditioning air is automatically changed in blowing direction by the louver disposed at the upper end outlet 29 of the pillar duct 24. In addition, in place of the single sub-blower 12 disposed behind a center console in the passenger compartment 7, two sub-blowers, one disposed in close proximity to each of side shills for each pillar duct 24, may be employed. The pillar duct 24 may be disposed in the inside of the center pillar in place being externally extended along the center pillar.

What is claimed is:

1. An air conditioning system for an automotive vehicle having a sunroof which is automatically titled up and down, a ceiling of a passenger compartment which has a ceiling opening located below the sunroof and automatically opened and closed, and air conditioning system comprising:

a conditioning air path in which conditioning air flows;

blower means for drawing in at least recirculated air recirculating inside the passenger compartment and discharging said recirculated air as conditioning air into said conditioning air path;

air temperature controlling means for controlling a temperature of said conditioning air flowing in said conditioning air path;

front air outlets to which said conditioning air path leads and through which said conditioning air blows toward passengers in the passenger compartment from the front of the passenger compartment;

a roof air path connected to said conditioning air path so as to extend as an extension of said conditioning air path and put said ceiling opening operative as an air outlet;

a room temperature sensor for monitoring a room temperature in the passenger compartment of the vehicle;

room temperature setting means for setting a desired room temperature; and control means for switching said air conditioning system in operation from a first operation mode wherein said air conditioning system open said sunroof and closes said ceiling opening according to differences of said room temperature from said desired room temperature so that said conditioning air flowing in said conditioning air path is partly introduced into said roof air path and then forced out of the vehicle through said sunroof and partly cooled by said air temperature controlling means and forced to blow into the passenger compartment through said front air outlets to a second operation mode in which, subsequently to operation in said first operation mode, said conditioning air is forced to blow into said passenger compartment through said from air outlets and prevented from blowing into said passenger compartment through said ceiling air opening when said difference of said room temperature from said desired room temperature is larger than a specified value and an amount of said conditioning air blowing into said passenger compartment through said front air outlets is reduced and an amount of said conditioning air that is introduced into said roof air path and then forced to blow into the passenger compartment through said ceiling opening is increased when said difference of said room temperature from said desired room temperature is smaller than said specified value.

2. An air conditioning system for an automotive vehicle comprising:

a conditioning air path through which at least one of recirculated air recirculating inside a passenger compartment of the vehicle and outside air introduced from the outside of the vehicle is introduced and flows;

blower means for drawing in air through said conditioning air path and discharging said air as conditioning air into said conditioning air path;

air temperature controlling means for controlling a temperature of said conditioning air flowing in said conditioning air path;

a ceiling opening formed in a ceiling of the passenger compartment and in communication with said conditioning air path;

front air outlets to which said conditioning air path leads and through which said conditioning air blows toward passengers in the passenger compartment from the front of the passenger compartment;

control means for controlling proportions of amounts of said conditioning air that blows into the passenger compartment through said front air outlets and said ceiling opening according to room conditions in the passenger compartment; and a room temperature sensor for monitoring a room temperature in the passenger compartment and room temperature setting means for setting a desired room temperature;

said control means controlling said proportions of amounts of said conditioning air that blows into the passenger compartment through said front air outlets and through said ceiling opening according to differences of said room temperature from said desired room temperature, forcing said conditioning air to blow into the passenger compartment through said front air outlets only when said difference of said room temperature from said desired room temperature is larger than a specified value, reducing an amount of said conditioning air blowing into said passenger compartment through said front air outlets, and increasing an amount of said conditioning air blowing into the passenger compartment through said ceiling opening when said difference of said room temperature from said desired room temperature is smaller than said specified value.

3. An air conditioning system for an automotive vehicle comprising:

a conditioning air path through which at least one of recirculated air recirculating inside a passenger compartment of the vehicle and outside air introduced from the outside of the vehicle is introduced and flows;

blower means for drawing in air through said conditioning air path and discharging said air as conditioning air into said conditioning air path;

air temperature controlling means for controlling a temperature of said conditioning air flowing in said conditioning air path;

a ceiling opening formed in a ceiling of the passenger compartment and in communication with said conditioning air path;

front air outlets to which said conditioning air path leads and through which said conditioning air blows toward passengers in the passenger compartment from the front of the passenger compartment;

control means for controlling proportions of amounts of said conditioning air that blows into the passenger compartment through said front air outlets and said ceiling opening according to room conditions in the passenger compartment; and a solar radiation intensity sensor for monitoring an intensity of solar radiation that comes into the passenger compartment, said control means controlling said proportions of amounts of said conditioning air that blows into the passenger compartment through said front air outlets and through said ceiling opening according to said solar radiation intensities, reducing an amount of said conditioning air blowing into said passenger compartment through said front air outlets, and increasing an amount of said conditioning air blowing into the passenger compartment through said ceiling opening when said solar radiation intensity is lower than a specified value.

4. An air conditioning system for an automotive vehicle comprising:

a conditioning air path through which at least one of recirculated air recirculating inside a passenger compartment of the vehicle and outside air introduced from the outside of the vehicle is introduced and flows;

blower means for drawing in air through said conditioning air path and discharging said air as conditioning air into said conditioning air path;

air temperature controlling means for controlling a temperature of said conditioning air flowing in said conditioning air path;

a ceiling opening formed in a ceiling of the passenger compartment and in communication with said conditioning air path;

front air outlets to which said conditioning air path leads and through which said conditioning air blows toward passengers in the passenger compartment from the front of the passenger compartment; and control means for controlling proportions of amounts of said conditioning air that blows into the passenger compartment through said front air outlets and said ceiling opening according to room conditions in the passenger compartment;

said blower means comprising a main blower which draws in said recirculated air and said outside air and a sub-blower which draws in said recirculated air, and said conditioning air path being provided with a sub-air inlet which opens into the passenger compartment at a center of a floor of the passenger compartment and through which said sub-blower draws recirculated air and switching means for switching drawing of recirculated air from a state;

wherein said recirculated air is drawn by said sub-blower through said sub-air inlet to a state where said recirculated air is drawn by said sub-blower through said ceiling opening and vice versa and introduces said recirculated air drawn by said sub-blower to said main blower.

5. An air conditioning system as defined in claim 4, wherein said conditioning air path comprises a pillar duct section which extends upward along a center pillar of the vehicle and is in communication with said ceiling opening at one of opposite ends of said pillar duct section, a main duct section which is connected at one of opposite ends to said main blowers at an outlet side of the main blower and at another of said opposite ends to another end of said pillar duct section, a sub-inlet duct section which is connected at one end of said sub-blower and at another end to said main duct section so as to be able to switch between a state in which said sub-inlet duct section is in communication with said pillar duct section and a state in which said sub-inlet duct section is isolated from said pillar duct section and is provided with said sub-air inlet adapted to be opened and closed, a sub-discharge duct section which is connected at one end to said sub-blower and at another end to said main blower, a recirculation duct section which extends between said main duct section and said sub-discharge duct section, and a damper mechanism operative to switch communication of said sub-discharge duct section and said recirculation duct section between a state in which said sub-discharge duct section is opened and said sub-discharge duct section is shut off and a state in which said sub-discharge duct section is shut off and said sub-discharge duct section is opened.

6. An air conditioning system as defined in claim 5, wherein said pillar duct section is provided for each of opposite center pillars of the vehicle and said sub-blower is disposed one at a center of a floor of the passenger compartment.

7. An air conditioning system as defined in claim 5, wherein said pillar duct section is provided for each of opposite center pillars of the vehicle and said sub-blower is disposed one at each side of a floor of the passenger compartment in connection with each said pillar duct section.

8. An air conditioning system for an automotive vehicle comprising:
- a conditioning air path through which at least one of recirculated air recirculating inside a passenger compartment of the vehicle and outside air introduced form the outside of the vehicle is introduced and flows;
- blower means for drawing in air through said conditioning air path and discharging said air as conditioning air into said conditioning air path;
- air temperature controlling means for controlling a temperature of said conditioning air flowing in said conditioning air path;
- a ceiling opening formed in a ceiling of the passenger compartment and in communication with said conditioning air path;
- front air outlets to which said conditioning air path leads and through which said conditioning air blows toward passengers in the passenger compartment from the front of the passenger compartment; and
- control means for controlling proportions of amounts of said conditioning air that blows into the passenger compartment through said front air outlets and said ceiling opening according to room conditions in the passenger compartment
- said blower means comprising a main blower which draws in said recirculated air and said outside air and sub-blower which draws in said recirculated air, and said conditioning air path is provided with a sub-air inlet which opens into the passenger compartment at a center of a floor of the passenger compartment and through which said sub-blower draws recirculated air and switching means for switching drawing of recirculated air from a state in which said recirculated air is drawn by said sub-blower through said sub-air inlet to a state where said recirculated air is drawn by said sub-blower through said ceiling opening and vice versa and switching direction of said recirculated air from a state in which said recirculated air drawn by said sub-blower is directed toward said main blower to a state in which said recirculated air is directed toward said ceiling opening and vice versa.

9. An air conditioning system as defined in claim 8, wherein said conditioning air path comprises a pillar duct section which extends upward along a center pillar of the vehicle and is in communication with said ceiling opening at one of opposite ends of said pillar duct section, a main duct section which is connected at one of opposite ends to said main blower at an outlet side of the main blower and at another of said opposite ends to another end of said pillar duct section,
- a sub-inlet duct section which is connected at one end to said sub-blower and at another end of said main duct section so as to be able to switch between a state in which said sub-inlet duct section is in communication with said pillar duct section and a state in which said sub-inlet duct section is isolated from said pillar duct section and is provided with said sub-air inlet adapted to be opened and closed, a sub-discharge duct section which is connected at one end of said sub-blower and at another end to said main blower, a recirculation duct section which extends between said main duct section and said sub-discharge duct section, and a damper mechanism operative to switch communication of said sub-discharge duct section and said recirculation duct section between a state in which said sub-discharge duct section is opened and said sub-discharge duct is shut off and a state in which said sub-discharge duct section is shut off and said sub-discharging duct section is opened.

10. An air conditioning system as defined in claim 9, wherein said pillar duct section is provided for each of opposite center pillars of the vehicle and said sub-blower is disposed one at a center of a floor of the passenger compartment.

11. An air conditioning system as defined in claim 9, wherein said pillar duct section is provided for each of opposite center pillars of the vehicle and said sub-blower is disposed one at each side of a floor of the passenger compartment in connection with each said pillar duct section.

12. An air conditioning system for an automotive vehicle comprising:
- a conditioning air path having a sub-air inlet opening into the passenger compartment at a center of a floor of the passenger compartment through which at least one of recirculated air recirculating inside a passenger compartment of the vehicle and outside air introduced from the outside of the vehicle is introduced and flows;
- blower means for drawing in air through said conditioning air path and discharging said air as conditioning air into said conditioning air path;
- air temperature controlling means for controlling a temperature of said conditioning air flowing in said conditioning air path;
- a ceiling opening formed in a ceiling of the passenger compartment and in communication with said conditioning air path;
- front air outlets to which said conditioning air path leads and through which said conditioning air blows toward passengers in the passenger compartment from the front of the passenger compartment; and
- control means for controlling proportions of amounts of said conditioning air that blows into the passenger compartment through which said front air outlets and said ceiling opening according to room conditions in the passenger compartment
- said air conditioning system being operation in an operative mode in which said blower means draws said recirculated air through at least said sub-air inlet and blows said recirculated air into the passenger compartment from the front of the passenger compartment toward passengers in the passenger compartment after increasing or decreasing a temperature of said recirculated air by said air temperature controlling means.

13. An air conditioning system for an automotive vehicle comprising:
- a conditioning air path having a sub-air inlet opening into the passenger compartment at a center of a floor of the passenger compartment through which at least one of recirculated air recirculating inside a passenger compartment of the vehicle and outside air introduced from the outside of the vehicle is introduced and flows;
- blower means for drawing in air through said conditioning air path and discharging said air as conditioning air into said conditioning air path;
- air temperature controlling means for controlling a temperature of said conditioning air flowing in said conditioning air path;

a ceiling opening formed in a ceiling of the passenger compartment and in communication with said conditioning air path;

front air outlets to which said conditioning air path leads and through which said conditioning air blows toward passengers in the passenger compartment from the front of the passenger compartment;

control means for controlling proportions of amounts of said conditioning air that blows into the passenger compartment through said front air outlets and said ceiling opening according to room conditions in the passenger compartment; and defrosted air outlets;

wherein said air conditioning system is operative in an operation mode in which said blower means draws said recirculated air through said sub-air inlet and blows said recirculated air through said defroster air outlets after increasing a temperature of said recirculated air by said air temperature cooling means.

* * * * *